US010225299B2

(12) United States Patent
van der Schaar et al.

(10) Patent No.: US 10,225,299 B2
(45) Date of Patent: *Mar. 5, 2019

(54) SYSTEMS, METHODS, AND MEDIA FOR CONTROLLING DELIVERY OF CONTENT

(71) Applicant: DIVX, LLC, San Diego, CA (US)

(72) Inventors: Auke Sjoerd van der Schaar, Los Angeles, CA (US); Abhishek Shivadas, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/943,004

(22) Filed: Nov. 16, 2015

(65) Prior Publication Data

US 2016/0149981 A1  May 26, 2016

Related U.S. Application Data

(63) Continuation of application No. 13/732,140, filed on Dec. 31, 2012, now Pat. No. 9,191,457.

(51) Int. Cl.
*G06F 15/16* (2006.01)
*H04L 29/06* (2006.01)
(Continued)

(52) U.S. Cl.
CPC .......... *H04L 65/4092* (2013.01); *H04L 65/00* (2013.01); *H04L 65/80* (2013.01);
(Continued)

(58) Field of Classification Search
CPC ....... H04N 21/25808; H04N 21/44209; H04N 21/23406; H04N 21/2401; H04N 21/44004
(Continued)

(56) References Cited

U.S. PATENT DOCUMENTS 4,009,331 A   2/1977  Goldmark et al.
4,694,357 A   9/1987  Rahman et al.
(Continued)

FOREIGN PATENT DOCUMENTS

CN   1169229 A   12/1997
CN   1221284 A   6/1999
(Continued)

OTHER PUBLICATIONS

European Supplementary Search Report for Application EP11824682, completed Feb. 6, 2014, 4 pgs.
(Continued)

*Primary Examiner* — Quang N Nguyen
(74) *Attorney, Agent, or Firm* — KPPB LLP

(57) ABSTRACT

Methods, systems, and computer readable media for controlling delivery of content are provided. In some embodiments, a system for controlling delivery of content is provided. The system includes processing circuitry configured to: transmit, to a server, a plurality of requests for blocks of the content; while at least some of the plurality of requests are still outstanding: detect a change of a service characteristic of a connection between the system and the server; determine a preferred number of outstanding requests; and cancel at least some of the requests from the plurality that are still outstanding based on the preferred number and a count of the requests from the plurality that are still outstanding.

14 Claims, 9 Drawing Sheets

(51) Int. Cl.
*H04L 29/08* (2006.01)
*H04N 21/442* (2011.01)
*H04N 21/637* (2011.01)
*H04N 21/845* (2011.01)
*H04N 21/854* (2011.01)

(52) U.S. Cl.
CPC ....... *H04L 67/32* (2013.01); *H04N 21/44209* (2013.01); *H04N 21/637* (2013.01); *H04N 21/8456* (2013.01); *H04N 21/85406* (2013.01)

(58) Field of Classification Search
USPC ....... 709/223, 229, 203, 206, 217, 219, 224, 709/226, 228, 230, 232, 238
See application file for complete search history.

(56) References Cited

U.S. PATENT DOCUMENTS

| | | |
|---|---|---|
| 4,802,170 A | 1/1989 | Trottier |
| 4,964,069 A | 10/1990 | Ely |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,479,303 A | 12/1995 | Suzuki et al. |
| 5,487,167 A | 1/1996 | Dinallo et al. |
| 5,502,766 A | 3/1996 | Boebert et al. |
| 5,509,070 A | 4/1996 | Schull |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,583,652 A | 12/1996 | Ware |
| 5,589,993 A | 12/1996 | Naimpally et al. |
| 5,621,794 A | 4/1997 | Matsuda et al. |
| 5,627,936 A | 5/1997 | Prasad |
| 5,633,472 A | 5/1997 | DeWitt et al. |
| 5,642,171 A | 6/1997 | Baumgartner et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,403 A | 2/1998 | Stefik |
| 5,717,816 A | 2/1998 | Boyce et al. |
| 5,719,786 A | 2/1998 | Nelson et al. |
| 5,745,643 A | 4/1998 | Mishina |
| 5,751,280 A | 5/1998 | Abbott |
| 5,754,648 A | 5/1998 | Ryan et al. |
| 5,763,800 A | 6/1998 | Rossum et al. |
| 5,765,164 A | 6/1998 | Prasad et al. |
| 5,794,018 A | 8/1998 | Vrvilo et al. |
| 5,805,700 A | 9/1998 | Nardone et al. |
| 5,822,524 A | 10/1998 | Chen et al. |
| 5,828,370 A | 10/1998 | Moeller et al. |
| 5,841,432 A | 11/1998 | Carmel et al. |
| 5,844,575 A | 12/1998 | Reid |
| 5,848,217 A | 12/1998 | Tsukagoshi et al. |
| 5,867,625 A | 2/1999 | McLaren |
| 5,887,110 A | 3/1999 | Sakamoto et al. |
| 5,892,900 A | 4/1999 | Ginter et al. |
| 5,903,261 A | 5/1999 | Walsh et al. |
| 5,907,597 A | 5/1999 | Mark |
| 5,946,446 A | 8/1999 | Yanagihara |
| 5,956,729 A | 9/1999 | Goetz et al. |
| 5,959,690 A | 9/1999 | Toebes, VIII et al. |
| 5,970,147 A | 10/1999 | Davis |
| 5,999,812 A | 12/1999 | Himsworth |
| 6,031,622 A | 2/2000 | Ristow et al. |
| 6,038,257 A | 3/2000 | Brusewitz et al. |
| 6,044,469 A | 3/2000 | Horstmann |
| 6,046,778 A | 4/2000 | Nonomura et al. |
| 6,047,100 A | 4/2000 | McLaren |
| 6,058,240 A | 5/2000 | McLaren |
| 6,064,794 A | 5/2000 | McLaren et al. |
| 6,065,050 A | 5/2000 | DeMoney |
| 6,018,611 A | 6/2000 | Nogami et al. |
| 6,079,566 A | 6/2000 | Eleftheriadis et al. |
| 6,097,877 A | 8/2000 | Katayama et al. |
| 6,141,754 A | 10/2000 | Choy |
| 6,155,840 A | 12/2000 | Sallette |
| 6,169,242 B1 | 1/2001 | Fay et al. |
| 6,175,921 B1 | 1/2001 | Rosen |
| 6,195,388 B1 | 2/2001 | Choi et al. |
| 6,204,883 B1 | 3/2001 | Tsukagoshi |
| 6,222,981 B1 | 4/2001 | Rijckaert |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,308,005 B1 | 10/2001 | Ando et al. |
| 6,330,286 B1 | 12/2001 | Lyons et al. |
| 6,374,144 B1 | 4/2002 | Viviani et al. |
| 6,389,218 B2 | 5/2002 | Gordon et al. |
| 6,389,473 B1 | 5/2002 | Carmel et al. |
| 6,395,969 B1 | 5/2002 | Fuhrer |
| 6,397,230 B1 | 5/2002 | Carmel et al. |
| 6,418,270 B1 | 7/2002 | Steenhof et al. |
| 6,449,719 B1 | 9/2002 | Baker |
| 6,466,671 B1 | 10/2002 | Maillard et al. |
| 6,466,733 B1 | 10/2002 | Kim |
| 6,510,513 B1 | 1/2003 | Danieli |
| 6,510,554 B1 | 1/2003 | Gordon et al. |
| 6,621,979 B1 | 9/2003 | Eerenberg et al. |
| 6,625,320 B1 | 9/2003 | Ghanbari |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,697,568 B1 | 2/2004 | Kaku |
| 6,725,281 B1 | 4/2004 | Zintel |
| 6,771,703 B1 | 8/2004 | Oguz et al. |
| 6,807,306 B1 | 10/2004 | Girgensohn et al. |
| 6,810,031 B1 | 10/2004 | Hegde et al. |
| 6,810,389 B1 | 10/2004 | Meyer |
| 6,819,394 B1 | 11/2004 | Nomura et al. |
| 6,850,252 B1 | 2/2005 | Hoffberg |
| 6,856,997 B2 | 2/2005 | Lee et al. |
| 6,859,496 B1 | 2/2005 | Boroczky et al. |
| 6,917,652 B2 | 7/2005 | Lyu |
| 6,931,531 B1 | 8/2005 | Takahashi |
| 6,944,621 B1 | 9/2005 | Collart |
| 6,944,629 B1 | 9/2005 | Shioi et al. |
| 6,956,901 B2 | 10/2005 | Boroczky et al. |
| 6,965,724 B1 | 11/2005 | Boccon-Gibod et al. |
| 6,965,993 B2 | 11/2005 | Baker |
| 6,985,588 B1 | 1/2006 | Glick et al. |
| 6,988,144 B1 | 1/2006 | Luken et al. |
| 7,007,170 B2 | 2/2006 | Morten |
| 7,023,924 B1 | 4/2006 | Keller et al. |
| 7,043,473 B1 | 5/2006 | Rassool et al. |
| 7,103,906 B1 | 9/2006 | Katz et al. |
| 7,127,155 B2 | 10/2006 | Ando et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,185,363 B1 | 2/2007 | Narin et al. |
| 7,197,234 B1 | 3/2007 | Chatterton |
| 7,206,940 B2 | 4/2007 | Evans et al. |
| 7,209,892 B1 | 4/2007 | Galuten et al. |
| 7,231,132 B1 | 6/2007 | Davenport |
| 7,237,061 B1 | 6/2007 | Boic |
| 7,242,772 B1 | 7/2007 | Tehranchi |
| 7,243,346 B1 | 7/2007 | Seth et al. |
| 7,295,673 B2 | 11/2007 | Grab et al. |
| 7,328,345 B2 | 2/2008 | Morten et al. |
| 7,330,875 B1 | 2/2008 | Parasnis et al. |
| 7,340,528 B2 | 3/2008 | Noblecourt et al. |
| 7,349,886 B2 | 3/2008 | Morten et al. |
| 7,356,143 B2 | 4/2008 | Morten |
| 7,356,245 B2 | 4/2008 | Belknap et al. |

(56) References Cited

U.S. PATENT DOCUMENTS

| | | | |
|---|---|---|---|
| 7,366,788 B2 | 4/2008 | Jones et al. |
| 7,376,831 B2 | 5/2008 | Kollmyer et al. |
| 7,406,174 B2 | 7/2008 | Palmer |
| 7,421,411 B2 | 9/2008 | Kontio et al. |
| 7,454,780 B2 | 11/2008 | Katsube et al. |
| 7,457,359 B2 | 11/2008 | Mabey et al. |
| 7,472,280 B2 | 12/2008 | Giobbi |
| 7,478,325 B2 | 1/2009 | Foehr |
| 7,484,103 B2 | 1/2009 | Woo et al. |
| 7,493,018 B2 | 2/2009 | Kim |
| 7,499,938 B2 | 3/2009 | Collart |
| 7,515,710 B2 | 4/2009 | Russell et al. |
| 7,526,450 B2 | 4/2009 | Hughes et al. |
| 7,594,271 B2 | 9/2009 | Zhuk et al. |
| 7,610,365 B1 | 10/2009 | Kraft et al. |
| 7,640,435 B2 | 12/2009 | Morten |
| 7,689,510 B2 | 3/2010 | Lamkin et al. |
| 7,720,352 B2 | 5/2010 | Belknap et al. |
| 7,747,853 B2 | 6/2010 | Candelore et al. |
| 7,761,892 B2 | 7/2010 | Ellis et al. |
| 7,779,097 B2 | 8/2010 | Lamkin et al. |
| 7,788,271 B2 | 8/2010 | Soma et al. |
| 7,817,608 B2 | 10/2010 | Rassool et al. |
| 7,869,691 B2 | 1/2011 | Kelly et al. |
| 7,882,034 B2 | 2/2011 | Hug et al. |
| 7,949,703 B2 | 5/2011 | Matsuzaki et al. |
| 7,962,942 B1 | 6/2011 | Craner |
| 7,974,714 B2 | 7/2011 | Hoffberg |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,082,442 B2 | 12/2011 | Keljo et al. |
| 8,195,714 B2 | 6/2012 | Mckibben et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,245,124 B1 | 8/2012 | Gupta |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,275,871 B2 * | 9/2012 | Ram | G06F 9/5083 |
| | | | 709/223 |
| 8,289,338 B2 | 10/2012 | Priyadarshi et al. |
| 8,291,460 B1 | 10/2012 | Peacock |
| 8,296,434 B1 | 10/2012 | Miller et al. |
| 8,311,111 B2 | 11/2012 | Xu |
| 8,311,115 B2 | 11/2012 | Gu et al. |
| 8,321,556 B1 | 11/2012 | Chatterjee et al. |
| 8,341,715 B2 | 12/2012 | Sherkin et al. |
| 8,386,621 B2 | 2/2013 | Park |
| 8,396,114 B2 | 3/2013 | Gu et al. |
| 8,401,900 B2 | 3/2013 | Cansler et al. |
| 8,407,753 B2 | 3/2013 | Kuo |
| 8,412,841 B1 | 4/2013 | Swaminathan et al. |
| 8,423,889 B1 | 4/2013 | Zagorie et al. |
| 8,452,110 B2 | 5/2013 | Shoham et al. |
| 8,456,380 B2 | 6/2013 | Pagan |
| 8,472,792 B2 | 6/2013 | Butt |
| 8,473,630 B1 | 6/2013 | Galligan et al. |
| 8,510,303 B2 | 8/2013 | Soroushian et al. |
| 8,510,404 B2 | 8/2013 | Carmel et al. |
| 8,515,265 B2 | 8/2013 | Kwon et al. |
| 8,516,529 B2 | 8/2013 | Lajoie et al. |
| 8,527,645 B1 * | 9/2013 | Proffit | G06F 9/505 |
| | | | 709/229 |
| 8,595,378 B1 | 11/2013 | Cohn |
| 8,606,069 B2 | 12/2013 | Okubo et al. |
| 8,640,166 B1 | 1/2014 | Craner et al. |
| 8,649,669 B2 | 2/2014 | Braness et al. |
| 8,677,428 B2 | 3/2014 | Lewis et al. |
| 8,681,866 B1 | 3/2014 | Jia |
| 8,689,267 B2 | 4/2014 | Hunt |
| 8,726,264 B1 | 5/2014 | Allen et al. |
| RE45,052 E | 7/2014 | Li |
| 8,767,825 B1 | 7/2014 | Wang et al. |
| 8,774,609 B2 | 7/2014 | Drake et al. |
| 8,781,122 B2 | 7/2014 | Chan et al. |
| 8,805,109 B2 | 8/2014 | Shoham et al. |
| 8,806,188 B2 | 8/2014 | Braness et al. |
| 8,832,434 B2 | 9/2014 | Apostolopoulos et al. |
| 8,843,586 B2 | 9/2014 | Pantos et al. |
| 8,856,218 B1 | 10/2014 | Inskip |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,535 B2 | 12/2014 | Ma et al. |
| 8,918,636 B2 | 12/2014 | Kiefer |
| 8,918,908 B2 | 12/2014 | Ziskind et al. |
| 8,948,249 B2 | 2/2015 | Sun et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,025,659 B2 | 5/2015 | Soroushian et al. |
| 9,042,670 B2 | 5/2015 | Carmel et al. |
| 9,060,207 B2 | 6/2015 | Scherkus et al. |
| 9,094,737 B2 | 7/2015 | Shivadas et al. |
| 9,098,335 B2 * | 8/2015 | Muthiah | G06F 9/5011 |
| 9,124,773 B2 | 9/2015 | Chan et al. |
| 9,125,073 B2 | 9/2015 | Oyman et al. |
| 9,184,920 B2 | 11/2015 | Grab et al. |
| 9,191,457 B2 | 11/2015 | Van der Schaar |
| 9,197,685 B2 | 11/2015 | Soroushian et al. |
| 9,203,816 B2 | 12/2015 | Brueck et al. |
| 9,210,481 B2 | 12/2015 | Braness et al. |
| 9,215,466 B2 | 12/2015 | Zhai et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,253,178 B2 | 2/2016 | Blom et al. |
| 9,264,475 B2 | 2/2016 | Shivadas et al. |
| 9,294,531 B2 | 3/2016 | Zhang et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,344,721 B2 | 5/2016 | Dikvall |
| 9,479,805 B2 | 10/2016 | Rothschild et al. |
| 9,485,546 B2 | 11/2016 | Chen et al. |
| 9,571,827 B2 | 2/2017 | Su et al. |
| 9,584,557 B2 | 2/2017 | Panje et al. |
| 9,584,847 B2 | 2/2017 | Ma et al. |
| 9,621,522 B2 | 4/2017 | Kiefer et al. |
| 9,706,259 B2 | 7/2017 | Chan et al. |
| 9,712,890 B2 | 7/2017 | Shivadas et al. |
| 9,813,740 B2 | 11/2017 | Panje et al. |
| 9,866,878 B2 | 1/2018 | van der Schaar et al. |
| 9,883,204 B2 | 1/2018 | Braness et al. |
| 9,906,785 B2 | 2/2018 | Naletov et al. |
| 9,967,189 B2 * | 5/2018 | Patel | H04L 47/11 |
| 9,967,305 B2 | 5/2018 | Braness |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2001/0053222 A1 | 12/2001 | Wakao |
| 2002/0026560 A1 | 2/2002 | Jordan et al. |
| 2002/0034252 A1 | 3/2002 | Owen et al. |
| 2002/0051494 A1 | 5/2002 | Yamaguchi et al. |
| 2002/0057898 A1 | 5/2002 | Normile |
| 2002/0062313 A1 | 5/2002 | Lee et al. |
| 2002/0076112 A1 | 6/2002 | Devara |
| 2002/0087569 A1 | 7/2002 | Fischer et al. |
| 2002/0091665 A1 | 7/2002 | Van Beek et al. |
| 2002/0093571 A1 | 7/2002 | Hyodo |
| 2002/0110193 A1 | 8/2002 | Yoo et al. |
| 2002/0116481 A1 | 8/2002 | Lee |
| 2002/0118953 A1 | 8/2002 | Kim |
| 2002/0120934 A1 | 8/2002 | Abrahams et al. |
| 2002/0136298 A1 | 9/2002 | Anantharamu et al. |
| 2002/0143413 A1 | 10/2002 | Fay et al. |

(56) References Cited

U.S. PATENT DOCUMENTS

| | | |
|---|---|---|
| 2002/0143547 A1 | 10/2002 | Fay et al. |
| 2002/0147980 A1 | 10/2002 | Satoda |
| 2002/0159598 A1 | 10/2002 | Rubinstein et al. |
| 2002/0161462 A1 | 10/2002 | Fay |
| 2002/0180929 A1 | 12/2002 | Tseng et al. |
| 2002/0184159 A1 | 12/2002 | Tayadon et al. |
| 2002/0184515 A1 | 12/2002 | Oho et al. |
| 2002/0191112 A1 | 12/2002 | Akiyoshi et al. |
| 2002/0191959 A1 | 12/2002 | Lin et al. |
| 2002/0191960 A1 | 12/2002 | Fujinami et al. |
| 2003/0001964 A1 | 1/2003 | Masukura et al. |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1 | 2/2003 | Wee |
| 2003/0061305 A1 | 3/2003 | Copley et al. |
| 2003/0061369 A1 | 3/2003 | Aksu et al. |
| 2003/0065777 A1 | 4/2003 | Mattila et al. |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0152370 A1 | 8/2003 | Otomo et al. |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0006701 A1 | 1/2004 | Kresina |
| 2004/0021684 A1 | 2/2004 | Millner |
| 2004/0024688 A1 | 2/2004 | Bi et al. |
| 2004/0025180 A1 | 2/2004 | Begeja et al. |
| 2004/0031058 A1 | 2/2004 | Reisman |
| 2004/0039916 A1 | 2/2004 | Aldis et al. |
| 2004/0047614 A1 | 3/2004 | Green |
| 2004/0052501 A1 | 3/2004 | Tam |
| 2004/0071453 A1 | 4/2004 | Valderas |
| 2004/0081333 A1 | 4/2004 | Grab et al. |
| 2004/0081434 A1 | 4/2004 | Jung et al. |
| 2004/0093618 A1 | 5/2004 | Baldwin et al. |
| 2004/0105549 A1 | 6/2004 | Suzuki et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0158878 A1 | 8/2004 | Ratnakar et al. |
| 2004/0184534 A1 | 9/2004 | Wang |
| 2004/0184616 A1 | 9/2004 | Morten et al. |
| 2004/0202320 A1 | 10/2004 | Amini et al. |
| 2004/0217971 A1 | 11/2004 | Kim |
| 2004/0255115 A1 | 12/2004 | DeMello et al. |
| 2004/0255236 A1 | 12/2004 | Collart |
| 2005/0004875 A1 | 1/2005 | Kontio et al. |
| 2005/0005025 A1 | 1/2005 | Harville et al. |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0071280 A1 | 3/2005 | Irwin et al. |
| 2005/0108320 A1 | 5/2005 | Lord et al. |
| 2005/0114534 A1 | 5/2005 | Lee |
| 2005/0114896 A1 | 5/2005 | Hug |
| 2005/0149450 A1 | 7/2005 | Stefik et al. |
| 2005/0180641 A1 | 8/2005 | Clark |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0204289 A1 | 9/2005 | Mohammed et al. |
| 2005/0207442 A1 | 9/2005 | van Zoest et al. |
| 2005/0207578 A1 | 9/2005 | Matsuyama et al. |
| 2005/0254508 A1 | 11/2005 | Aksu et al. |
| 2005/0273695 A1 | 12/2005 | Schnurr |
| 2005/0275656 A1 | 12/2005 | Corbin et al. |
| 2006/0015580 A1 | 1/2006 | Gabriel et al. |
| 2006/0026294 A1 | 2/2006 | Virdi et al. |
| 2006/0026302 A1 | 2/2006 | Bennett et al. |
| 2006/0036549 A1 | 2/2006 | Wu |
| 2006/0037057 A1 | 2/2006 | Xu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0093320 A1 | 5/2006 | Hallberg et al. |
| 2006/0120378 A1 | 6/2006 | Usuki et al. |
| 2006/0129909 A1 | 6/2006 | Butt et al. |
| 2006/0168639 A1 | 7/2006 | Gan et al. |
| 2006/0173887 A1 | 8/2006 | Breitfeld et al. |
| 2006/0179239 A1* | 8/2006 | Fluhr ................. G06F 12/0862 711/137 |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2006/0294164 A1 | 12/2006 | Armangau et al. |
| 2007/0005333 A1 | 1/2007 | Setiohardjo et al. |
| 2007/0031110 A1 | 2/2007 | Rijckaert |
| 2007/0033419 A1 | 2/2007 | Kocher et al. |
| 2007/0044010 A1 | 2/2007 | Sull et al. |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0133603 A1 | 6/2007 | Weaver |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0217339 A1 | 9/2007 | Zhao |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0271317 A1 | 11/2007 | Carmel et al. |
| 2007/0271385 A1 | 11/2007 | Davis et al. |
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0288745 A1 | 12/2007 | Kwan |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008455 A1 | 1/2008 | De Lange et al. |
| 2008/0043832 A1 | 2/2008 | Barkley et al. |
| 2008/0066099 A1 | 3/2008 | Brodersen et al. |
| 2008/0066181 A1 | 3/2008 | Haveson et al. |
| 2008/0077592 A1 | 3/2008 | Brodie et al. |
| 2008/0086456 A1 | 4/2008 | Rasanen et al. |
| 2008/0086747 A1 | 4/2008 | Rasanen et al. |

(56) References Cited

U.S. PATENT DOCUMENTS

| | | |
|---|---|---|
| 2008/0101466 A1 | 5/2008 | Swenson et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0126248 A1 | 5/2008 | Lee et al. |
| 2008/0137541 A1 | 6/2008 | Agarwal et al. |
| 2008/0137736 A1 | 6/2008 | Richardson et al. |
| 2008/0151817 A1 | 6/2008 | Fitchett |
| 2008/0172441 A1 | 7/2008 | Speicher et al. |
| 2008/0187283 A1 | 8/2008 | Takahashi |
| 2008/0192818 A1 | 8/2008 | DiPietro et al. |
| 2008/0195664 A1 | 8/2008 | Maharajh et al. |
| 2008/0195744 A1 | 8/2008 | Bowra et al. |
| 2008/0201705 A1 | 8/2008 | Wookey |
| 2008/0205860 A1 | 8/2008 | Holtman |
| 2008/0209534 A1 | 8/2008 | Keronen et al. |
| 2008/0240144 A1 | 10/2008 | Kruse et al. |
| 2008/0256105 A1 | 10/2008 | Nogawa et al. |
| 2008/0263354 A1 | 10/2008 | Beuque et al. |
| 2008/0279535 A1 | 11/2008 | Haque et al. |
| 2008/0294453 A1 | 11/2008 | Baird-Smith et al. |
| 2008/0298358 A1 | 12/2008 | John et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0064341 A1 | 3/2009 | Hartung et al. |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0165148 A1 | 6/2009 | Frey et al. |
| 2009/0168795 A1 | 7/2009 | Segel et al. |
| 2009/0169181 A1 | 7/2009 | Priyadarshi et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |
| 2009/0228395 A1 | 9/2009 | Wegner et al. |
| 2009/0265737 A1 | 10/2009 | Issa et al. |
| 2009/0290706 A1 | 11/2009 | Amini et al. |
| 2009/0290708 A1 | 11/2009 | Schneider et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0040351 A1 | 2/2010 | Toma et al. |
| 2010/0057928 A1 | 3/2010 | Kapoor et al. |
| 2010/0058405 A1 | 3/2010 | Ramakrishnan et al. |
| 2010/0074324 A1 | 3/2010 | Qian et al. |
| 2010/0074333 A1 | 3/2010 | Au et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142917 A1 | 6/2010 | Isaji |
| 2010/0158109 A1 | 6/2010 | Dahlby et al. |
| 2010/0161825 A1 | 6/2010 | Ronca et al. |
| 2010/0166060 A1 | 7/2010 | Ezure et al. |
| 2010/0186092 A1 | 7/2010 | Takechi et al. |
| 2010/0189183 A1 | 7/2010 | Gu et al. |
| 2010/0218208 A1 | 8/2010 | Holden |
| 2010/0228795 A1 | 9/2010 | Hahn |
| 2010/0235472 A1 | 9/2010 | Sood et al. |
| 2010/0250532 A1 | 9/2010 | Soroushian et al. |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |
| 2010/0313226 A1 | 12/2010 | Cholas et al. |
| 2010/0319014 A1 | 12/2010 | Lockett et al. |
| 2010/0319017 A1 | 12/2010 | Cook |
| 2010/0332595 A1 | 12/2010 | Fullagar et al. |
| 2011/0002381 A1 | 1/2011 | Yang et al. |
| 2011/0016225 A1 | 1/2011 | Park |
| 2011/0047209 A1 | 2/2011 | Lindholm et al. |
| 2011/0055585 A1 | 3/2011 | Lee |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0107379 A1 | 5/2011 | Lajoie et al. |
| 2011/0116772 A1 | 5/2011 | Kwon et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0153835 A1 | 6/2011 | Rimac et al. |
| 2011/0184738 A1 | 7/2011 | Kalisky et al. |
| 2011/0191439 A1 | 8/2011 | Dazzi et al. |
| 2011/0191803 A1 | 8/2011 | Baldwin et al. |
| 2011/0197237 A1 | 8/2011 | Turner |
| 2011/0197267 A1 | 8/2011 | Gravel et al. |
| 2011/0213827 A1 | 9/2011 | Kaspar et al. |
| 2011/0222786 A1 | 9/2011 | Carmel et al. |
| 2011/0225302 A1 | 9/2011 | Park et al. |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0276695 A1 | 11/2011 | Maldaner et al. |
| 2011/0283012 A1 | 11/2011 | Melnyk |
| 2011/0291723 A1 | 12/2011 | Hashimoto |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon |
| 2012/0005368 A1 | 1/2012 | Knittle et al. |
| 2012/0017282 A1 | 1/2012 | Kang et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0066360 A1 | 3/2012 | Ghosh |
| 2012/0093214 A1 | 4/2012 | Urbach |
| 2012/0114302 A1 | 5/2012 | Randall et al. |
| 2012/0124191 A1 | 5/2012 | Lyon |
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0166633 A1 | 6/2012 | Baumback et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |

(56) References Cited

U.S. PATENT DOCUMENTS

| | | |
|---|---|---|
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1 | 9/2012 | Ma et al. |
| 2012/0254455 A1 | 10/2012 | Adimatyam et al. |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0289147 A1 | 11/2012 | Raleigh et al. |
| 2012/0294355 A1 | 11/2012 | Holcomb et al. |
| 2012/0297039 A1 | 11/2012 | Acuna et al. |
| 2012/0307883 A1 | 12/2012 | Graves |
| 2012/0311094 A1 | 12/2012 | Biderman et al. |
| 2012/0314778 A1 | 12/2012 | Salustri et al. |
| 2012/0317235 A1 | 12/2012 | Nguyen et al. |
| 2013/0007223 A1 | 1/2013 | Luby et al. |
| 2013/0013730 A1 | 1/2013 | Li et al. |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0055084 A1 | 2/2013 | Soroushian et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0066838 A1 | 3/2013 | Singla et al. |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0124859 A1 | 5/2013 | Pestoni et al. |
| 2013/0128962 A1 | 5/2013 | Rajagopalan et al. |
| 2013/0152767 A1 | 6/2013 | Katz et al. |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0170561 A1 | 7/2013 | Hannuksela |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179992 A1 | 7/2013 | Ziskind et al. |
| 2013/0182952 A1 | 7/2013 | Carmel et al. |
| 2013/0196292 A1 | 8/2013 | Brennen et al. |
| 2013/0212228 A1 | 8/2013 | Butler |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227081 A1* | 8/2013 | Luby .................. H04L 65/1083 709/219 |
| 2013/0227122 A1* | 8/2013 | Gao .................. H04L 65/1083 709/224 |
| 2013/0301424 A1 | 11/2013 | Kotecha et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0019593 A1 | 1/2014 | Reznik et al. |
| 2014/0037620 A1 | 2/2014 | Ferree et al. |
| 2014/0052823 A1 | 2/2014 | Gavade et al. |
| 2014/0059156 A1 | 2/2014 | Freeman, II et al. |
| 2014/0096171 A1 | 4/2014 | Shivadas et al. |
| 2014/0101722 A1 | 4/2014 | Moore |
| 2014/0115650 A1 | 4/2014 | Zhang et al. |
| 2014/0119432 A1 | 5/2014 | Wang et al. |
| 2014/0140396 A1 | 5/2014 | Wang et al. |
| 2014/0140417 A1 | 5/2014 | Shaffer et al. |
| 2014/0143301 A1 | 5/2014 | Watson et al. |
| 2014/0143431 A1 | 5/2014 | Watson et al. |
| 2014/0143440 A1 | 5/2014 | Ramamurthy et al. |
| 2014/0177734 A1 | 6/2014 | Carmel et al. |
| 2014/0189065 A1 | 7/2014 | van der Schaar et al. |
| 2014/0201382 A1 | 7/2014 | Shivadas et al. |
| 2014/0211840 A1 | 7/2014 | Butt et al. |
| 2014/0211859 A1 | 7/2014 | Carmel et al. |
| 2014/0241420 A1 | 8/2014 | Orton-jay et al. |
| 2014/0241421 A1 | 8/2014 | Orton-jay et al. |
| 2014/0247869 A1 | 9/2014 | Su |
| 2014/0250473 A1 | 9/2014 | Braness et al. |
| 2014/0258714 A1 | 9/2014 | Grab |
| 2014/0269927 A1 | 9/2014 | Naletov et al. |
| 2014/0269936 A1 | 9/2014 | Shivadas et al. |
| 2014/0280763 A1 | 9/2014 | Grab et al. |
| 2014/0297804 A1 | 10/2014 | Shivadas et al. |
| 2014/0297881 A1 | 10/2014 | Shivadas et al. |
| 2014/0355668 A1 | 12/2014 | Shoham et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |
| 2014/0376720 A1 | 12/2014 | Chan et al. |
| 2015/0006662 A1 | 1/2015 | Braness |
| 2015/0026677 A1 | 1/2015 | Stevens et al. |
| 2015/0049957 A1 | 2/2015 | Shoham et al. |
| 2015/0063693 A1 | 3/2015 | Carmel et al. |
| 2015/0067715 A1 | 3/2015 | Koat et al. |
| 2015/0104153 A1 | 4/2015 | Braness et al. |
| 2015/0117836 A1 | 4/2015 | Amidei et al. |
| 2015/0117837 A1 | 4/2015 | Amidei et al. |
| 2015/0139419 A1 | 5/2015 | Kiefer et al. |
| 2015/0188758 A1 | 7/2015 | Amidei et al. |
| 2015/0188842 A1 | 7/2015 | Amidei et al. |
| 2015/0188921 A1 | 7/2015 | Amidei et al. |
| 2015/0189017 A1 | 7/2015 | Amidei et al. |
| 2015/0189373 A1 | 7/2015 | Amidei et al. |
| 2015/0288996 A1 | 10/2015 | van der Schaar et al. |
| 2015/0334435 A1 | 11/2015 | Shivadas et al. |
| 2015/0373421 A1 | 12/2015 | Chan |
| 2016/0070890 A1 | 3/2016 | Grab et al. |
| 2016/0112382 A1 | 4/2016 | Kiefer et al. |
| 2016/0219303 A1 | 7/2016 | Braness et al. |
| 2017/0214947 A1 | 7/2017 | Kiefer et al. |
| 2018/0007451 A1 | 1/2018 | Shivadas et al. |
| 2018/0131980 A1 | 5/2018 | Van Der Schaar et al. |
| 2018/0220153 A1 | 8/2018 | Braness et al. |

FOREIGN PATENT DOCUMENTS

| | | |
|---|---|---|
| CN | 1723696 A | 1/2006 |
| EP | 0757484 A2 | 2/1997 |
| EP | 0813167 A2 | 12/1997 |
| EP | 0936812 A1 | 8/1999 |
| EP | 1056273 A2 | 11/2000 |
| EP | 1187483 A2 | 3/2002 |
| EP | 1420580 A1 | 5/2004 |
| EP | 1553779 A1 | 7/2005 |
| EP | 1657835 A1 | 5/2006 |
| EP | 1718074 A1 | 11/2006 |
| EP | 2486517 | 8/2012 |
| EP | 2486727 A1 | 8/2012 |
| EP | 2507995 A1 | 10/2012 |
| EP | 2564354 A1 | 3/2013 |
| EP | 2616991 | 7/2013 |
| EP | 2617192 | 7/2013 |
| EP | 2661696 A1 | 11/2013 |
| EP | 2661875 A1 | 11/2013 |
| EP | 2661895 A2 | 11/2013 |
| EP | 2716048 A1 | 4/2014 |
| EP | 2721826 A1 | 4/2014 |
| EP | 2751990 | 7/2014 |
| EP | 2807821 | 12/2014 |
| JP | 08046902 A | 2/1996 |
| JP | 8111842 A | 4/1996 |
| JP | 08163488 A | 6/1996 |
| JP | 08287613 A | 11/1996 |
| JP | 09037225 A | 2/1997 |
| JP | 11164307 A | 6/1999 |
| JP | 11275576 A | 10/1999 |
| JP | 11328929 A | 11/1999 |

(56) References Cited

FOREIGN PATENT DOCUMENTS

| | | |
|---|---|---|
| JP | 2000201343 A | 7/2000 |
| JP | 2001043668 A | 2/2001 |
| JP | 2001346165 A | 12/2001 |
| JP | 2002170363 A | 6/2002 |
| JP | 2002518898 A | 6/2002 |
| JP | 2002218384 A | 8/2002 |
| JP | 2003250113 A | 9/2003 |
| JP | 2004013823 A | 1/2004 |
| JP | 2004515941 A | 5/2004 |
| JP | 2004172830 A | 6/2004 |
| JP | 2004187161 A | 7/2004 |
| JP | 2004234128 A | 8/2004 |
| JP | 2005027153 A | 1/2005 |
| JP | 2005080204 A | 3/2005 |
| JP | 2006524007 A | 10/2006 |
| JP | 2007036666 A | 2/2007 |
| JP | 2007174375 A | 7/2007 |
| JP | 2007235690 A | 9/2007 |
| JP | 2007535881 A | 12/2007 |
| JP | 2008235999 A | 10/2008 |
| JP | 2014506430 A | 3/2014 |
| JP | 6038805 B2 | 12/2016 |
| JP | 2017063453 | 3/2017 |
| JP | 2018160923 A | 10/2018 |
| KR | 100221423 B1 | 6/1999 |
| KR | 2002013664 A | 2/2002 |
| KR | 20020064888 A | 8/2002 |
| KR | 100669616 B1 | 1/2007 |
| KR | 1020130133830 | 12/2013 |
| KR | 101874907 B1 | 7/2018 |
| WO | 1995015660 A1 | 6/1995 |
| WO | 1996013121 A1 | 5/1996 |
| WO | 1997031445 A3 | 4/1998 |
| WO | 1999010836 A1 | 3/1999 |
| WO | 1999065239 A2 | 12/1999 |
| WO | 0104892 A1 | 1/2001 |
| WO | 2001031497 A1 | 5/2001 |
| WO | 2001050732 A2 | 7/2001 |
| WO | 2001065762 A2 | 9/2001 |
| WO | 2002001880 A1 | 1/2002 |
| WO | 2002008948 A1 | 1/2002 |
| WO | 2002035832 A2 | 5/2002 |
| WO | 2002037210 A2 | 5/2002 |
| WO | 2002054196 A2 | 7/2002 |
| WO | 2003030000 A1 | 4/2003 |
| WO | 2003096136 A2 | 11/2003 |
| WO | 2004054247 A1 | 6/2004 |
| WO | 2004097811 A1 | 11/2004 |
| WO | 2004102571 A1 | 11/2004 |
| WO | 2006018843 A2 | 2/2006 |
| WO | 2006018843 A3 | 12/2006 |
| WO | 2007044590 A2 | 4/2007 |
| WO | 2007113836 A2 | 10/2007 |
| WO | 2008010275 A1 | 1/2008 |
| WO | 2008042242 A2 | 4/2008 |
| WO | 2008086313 A1 | 7/2008 |
| WO | 2007113836 A3 | 11/2008 |
| WO | 2008135932 A2 | 11/2008 |
| WO | 2009065137 A1 | 5/2009 |
| WO | 2010060106 A1 | 5/2010 |
| WO | 2010080911 A1 | 7/2010 |
| WO | 2010089962 A1 | 8/2010 |
| WO | 2010108053 A1 | 9/2010 |
| WO | 2010111261 A1 | 9/2010 |
| WO | 2010122447 A1 | 10/2010 |
| WO | 2010147878 A1 | 12/2010 |
| WO | 2011042898 A1 | 4/2011 |
| WO | 2011042900 A1 | 4/2011 |
| WO | 2011068668 A1 | 6/2011 |
| WO | 2011103364 A1 | 8/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |
| WO | 2012035534 A3 | 7/2012 |
| WO | 2012094171 A1 | 7/2012 |
| WO | 2012094181 A2 | 7/2012 |
| WO | 2012094189 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |
| WO | 2013032518 A2 | 3/2013 |
| WO | 2013103986 A2 | 7/2013 |
| WO | 2013111126 A2 | 8/2013 |
| WO | 2013111126 A3 | 8/2013 |
| WO | 2013032518 A3 | 9/2013 |
| WO | 2013144942 A1 | 10/2013 |
| WO | 2014145901 A1 | 9/2014 |
| WO | 2014193996 A2 | 12/2014 |
| WO | 2014193996 A3 | 2/2015 |
| WO | 2015031982 A1 | 3/2015 |

OTHER PUBLICATIONS

European Supplementary Search Report for Application EP08870152, Completed May 19, 2011, 9pgs.
European Search Report for Application EP 11855103.5, search completed Jun. 26, 2014, 9 pgs.
European Search Report for Application 11855237.1, completed Jun. 12, 2014, 9 pgs.
European Supplementary Search Report for Application EP09759600, completed Jan. 25, 2011, 11 pgs.
Extended European Search Report for European Application EP10821672, completed Jan. 30, 2014, 3 pgs.
Extended European Search Report for European Application 14763140.2, Search completed Sep. 26, 2016, dated Oct. 5, 2016, 9 Pgs.
European Supplementary Search Report for Application EP 10729513, completed Dec. 9, 2013, 4 pgs.
European Supplementary Search Report for Application EP 04813918, Search Completed Dec. 19, 2012, 3 pgs.
European Supplementary Search Report for Application 11774529, completed Jan. 31, 2014, 2 pgs.
European Supplementary Search Report for Application 10834935, Search Completed May 27, 2014, 9 pgs.
"OpenDML AVI File Format Extensions," Sep. 1997, Version 1.02, XP-002179318, OpenDML AVI M-JPEG File Format Subcommittee, 42 pgs.
10 KISS Players, "KISS DP-500", retrieved from http://www.kiss-technology.com/?p=dp500 on May 4, 2007, 1 pg.
Broadq, "The Ultimate Home Entertainment Software", 2002, printed May 11, 2009 from ittp://web.srchive.org/web/20030401122010/www.broadq.com/qcasttuner/, 1 pg.
Cloakware Corporation, "Protecting Digital Content Using Cloakware Code Transformation Technology", Version 1.2, May 2002, pp. 1-10.
Federal Computer Week, "Tool Speeds Info to Vehicles", Jul. 25, 1999, 5 pages.
Griffith, Eric, "The Wireless Digital Picture Frame Arrives", Wi-Fi Planet, Oct. 16, 2003, printed May 4, 2007 from http://www.wi-fiplanet.com/news/article.php/3093141, 3 pgs.
"HTTP Live Streaming Overview, Networking & Internet", Apple, Inc., Apr. 1, 2011, 38 pages.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
Informationweek, "Front End: Daily Dose, Internet on Wheels", Jul. 20, 1999, Printed on Mar. 26, 2014, 3 pgs.
International Preliminary Report on Patentability for International Application PCT/US14/30747, Report dated Sep. 15, 2015, dated Sep. 24, 2015, 6 Pgs.
International Preliminary Report on Patentability for International Application No. PCT/US2008/083816, dated May 19, 2010, 6 pgs.
International Preliminary Report on Patentability for International Application No. PCT/US2011/068276, dated Mar. 4, 2014, 23 pgs.
International Preliminary Report on Patentability for International Application PCT/US2013/043181, dated Dec. 31, 2014, dated Jan. 8, 2015, 11 Pgs.

(56) References Cited

OTHER PUBLICATIONS

International Preliminary Report on Patentability for International Application PCT/US2014/039852, dated Dec. 1, 2015, dated Dec. 5, 2015, 8 Pgs.
International Search Report and Written Opinion for International Application No. PCT/US07/63950, completed Feb. 19, 2008, dated Mar. 19, 2008, 9 pgs.
International Search Report and Written Opinion for International Application No. PCT/US08/87999, completed Feb. 7, 2009, dated Mar. 19, 2009, 6 pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2004/041667, completed May 24, 2007, dated Jun. 20, 2007, 6 pgs.
International Search Report and Written Opinion for International Application No. PCT/US2005/025845, completed Feb. 5, 2007 and dated May 10, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2010/020372, Completed Feb. 10, 2009, dated Mar. 1, 2010, 7 pgs.
International Search Report and Written Opinion for International Application No. PCT/US2010/56733, Completed Jan. 3, 2011, dated Jan. 14, 2011, 9 pgs.
International Search Report and Written Opinion for International Application No. PCT/US2013/043181, completed Nov. 27, 2013, dated Dec. 6, 2013, 12 pgs.
International Search Report and Written Opinion for International Application PCT/US14/39852, completed Oct. 21, 2014, dated Dec. 5, 2014, 11 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for International Application PCT/US2011/068276, completed Jun. 19, 2013, dated Jul. 8, 2013, 24 pgs.
International Search Report and Written Opinion for PCT/US2013/020572, completed Mar. 19, 2013, dated Apr. 29, 2013, 10 pgs.
ITS International, "Fleet System Opts for Mobile Server", Aug. 26, 1999, Printed on Oct. 21, 2011 from http://www.itsinternational.com/News/article.cfm?recordID=547, 1 page.
"Linksys Wireless-B Media Adapter Reviews", Jul. 30, 2003, printed May 4, 2007 from http://reviews.cnet.com/Linksys_Wireless_B_Media_Adapter/4505-6739_7-30421900.html?tag=box, 5 pgs.
Linksys, "KISS DP-500", 2007, printed May 4, 2007 from http://www.kiss-technology.com/?p=dp500, 2 pgs.
Linksys, "Enjoy your digital music and pictures on your home entertainment center, without stringing wires!", 2003, Model No. WMA 11B, printed May 9, 2007 from http://www.linksys.com/servlet/Satellite?c=L_Product_C2&childpagename=US/Layout&cid=1115416830950&p, 4 pages.
Microsoft Corporation, "Chapter 8, Multimedia File Formats" 1991, Microsoft Windows Multimedia Programmer's Reference, 3 cover pgs., pp. 8-1 to 8-20.
Microsoft Windows XP Media Center Edition 2005, "Frequently asked Questions", 2007, printed May 4, 2007 from http://www.microsoft.com/windowsxp/mediacenter/evaluation/faq.mspx, 6 pgs.
Microsoft Windows XP Media Center Edition 2005, "Features", 2007, printed May 9, 2007, from http://www.microsoft.com/windowsxp/mediacenter/evaluation/features.mspx, 4 pgs.
Purdy, "Boxqueue Bookmarklet Saves Videos for Later Boxee Watching", Lifehacker, Jun. 15, 2009, printed Jun. 16, 2009 from http://feeds.gawker.com/~r/lifehacker/full/~3/OHvDmrlgZZc/boxqueue-bookmarklet-saves-videos-for-late-boxee-watching, 2 pgs.
Author Unknown, "Tunneling QuickTime RTSP and RTP over HTTP", Published by Apple Computer, Inc.,1999, 6 pages.
Author Unknown, "Turbo-Charge Your Internet and PC Performance", printed Oct. 30, 2008 from Speedtest.net—The Global Broadband Speed Test, 1 pg.
Author Unknown, "White paper, The New Mainstream Wirless LAN Standard", Broadcom Corporation, IEEE 802.11g, Jul. 2, 2003, 12 pgs.
Blasiak, Ph.D., Darek, "Video Transrating and Transcoding: Overview of Video Transrating and Transcoding Technologies,", Ingenient Technologies, TI Developer Conference, Aug. 6-8, 2002, 22 pgs.
Casares et al., "Simplifying Video Editing Using Metadata", DIS2002, 2002, pp. 157-166.
Deutscher, "IIS Transform Manager Beta—Using the MP4 to Smooth Task", Apr. 29, 2011, Retrieved from https://web.archive.org/web/20130328111303/http://blog.johndeutscher.com/category/smooth-streaming, 14 pgs.
Gannes, "The Lowdown on Apple's HTTP Adaptive Bitrate Streaming", GigaOM, Jun. 10, 2009, 12 pgs.
Garg et al., "An Experimental Study of Throughput for UDP and VoIP Traffic in IEEE 802.11b Networks", Wireless Communications and Networkings, Mar. 2003, pp. 1748-1753.
Gast, "When is 54 Not Equal to 54? A Look at 802.11a, b and g Throughput", Aug. 14, 2003, printed Oct. 30, 2008 from www.oreillynet.com/pub/a/wireless/2003/08/08/wireless_throughput.html, 4 pgs.
Ghosh, "Enhancing Silverlight Video Experiences with Contextual Data", Mar. 2010, Retrieved from: http://msdn.microsoft.com/en-us/magazine/ee336025.aspx, 3 pgs.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
Kaspar et al., "Using HTTP Pipelining to Improve Progressive Download over Multiple Heterogeneous Interfaces", IEEE ICC proceedings, 2010, 5 pgs.
Kim, Kyuheon, "MPEG-2 ES/PES/TS/PSI", Kyung-Hee University, Oct. 4, 2010, 66 pages.
Kozintsev et al., "Improving last-hop multicast streaming video over 802.11", Workshop on Broadband Wireless Multimedia, Oct. 2004, pp. 1-10.
Kurzke et al., "Get Your Content Onto Google TV", Google, 2012, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.
Long et al., "Silver: Simplifying Video Editing with Metadata", CHI 2003: New Horizons, Apr. 5-10, 2003, pp. 628-629.
MSDN, "Adaptive streaming, Expression Studio 2.0", Apr. 23, 2009, 2 pgs.
Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Nelson, Michael, "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Noboru, Takematsu, "Play Fast and Fine Video on Web! codec", Co. 9 No. 12, Dec. 1, 2003, 178-179.
Noe, A., "Matroska File Format (under construction!)", Jun. 24, 2007, Retrieved from http://web.archive.orgweb/20070821155146/www.matroska.org/technical/specs/matroska.pdf on Jan. 19, 2011, pp. 1-51.

(56) References Cited

OTHER PUBLICATIONS

Noe, Alexander "AVI File Format", Dec. 14, 2006, http://www.alexander-noe.com/video/documentation/avi.pdf, pp. 1-26.
Noe, Alexander "Definitions", Apr. 11, 2006, retrieved from http://www.alexander-noe.com/video/amg/definitions.html on Oct. 16, 2013, 2 pages.
Ooyala, "Widevine Content Protection", Ooyala Support Center for Developers. Ooyala, Inc., Jun. 3, 2013, retrieved from http://support.ooyala.com/developers/documentation/concepts/player_v3_widevine_integration.html, 7 pages.
Ozer, "The 2012 Encoding and Transcoding Buyers' Guide", Streamingmedia.com, Aug./Sep. 2012, Retrieved from: http://www.streamingmedia.com/Articles/Editorial/Featured-Articles/The-2012-Encoding-and-Transcoding-Buyers-Guide-84210.aspx, 8 pgs.
Pantos et al., "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos et al., "HTTP Live Streaming: draft-pantos-http-live-streaming-06", Published by the Internet Engineering Task Force (IETF), Mar. 31, 2011, 24 pages.
Papagiannaki et al., "Experimental Characterization of Home Wireless Networks and Design Implications", Infocom 2006, 25th IEEE International Conference of Computer Communications, Proceedings, Apr. 2006, 13 pgs.
Phamdo, Nam "Theory of Data Compression", printed from http://www.data-compression.com/theoroy.html on Oct. 10, 2003, 12 pgs.
RGB Networks, "Comparing Adaptive HTTP Streaming Technologies", Nov. 2011, Retrieved from http://btreport.net/wp-content/uploads/2012/02/RGB-Adaptive-HTTP-Streaming-Comparison-1211-01.pdf, 20 pgs.
Schulzrinne et al., "Real Time Streaming Protocol 2.0 (RTSP): draft-ietfmmusic-rfc2326bis-27", MMUSIC Working Group of the Internet Engineering Task Force (IETF), (presented in two parts), Mar. 9, 2011, 296 pages.
Siglin, "HTTP Streaming: What You Need to Know", streamingmedia.com, Feb./Mar. 2010, 15 pages.
Siglin, "Unifying Global Video Strategies, MP4 File Fragmentation for Broadcast, Mobile and Web Delivery", Nov. 16, 2011, 16 pgs.
Tan, Yap-Peng et al., "Video transcoding for fast forward/reverse video playback", IEEE ICIP, 2002, pp. 1-713 to 1-716.
Unknown, "AVI RIFF File Reference (Direct X 8.1 C++ Archive)", 2006, printed from http://msdn.microsoft.com/archive/en-us/dx81_c/directx_cpp/htm/avirifffilereference.asp?fr . . . on Mar. 6, 2006, 7 pgs.
Unknown, "Entropy and Source Coding (Compression)", TCOM 570, Sep. 1999, pp. 1-22.
Wang et al., "Image Quality Assessment: From Error Visibility to Structural Similarity", IEEE Transactions on Image Processing, Apr. 2004, vol. 13, No. 4, pp. 600-612.
Wu, Feng et al., "Next Generation Mobile Multimedia Communications: Media Codec and Media Transport Perspectives", In China Communications, Oct. 2006, pp. 30-44.
Zambelli, Alex, "IIS Smooth Streaming Technical Overview", Microsoft Corporation, Mar. 2009, 17 pages.
Captain, Sean, Future Gear: PC on the HiFi, and the TV, pc world.com, Jan. 21, 2003, from http://www.pcworld.com/article/id,108818-page,1/article.html, printed May 4, 2007, from IDG Networks, 2 pgs.
Microsoft Media Platform: Player Framework, "Silverlight Media Framework v1.1", Microsoft, Jan. 2010, 2 pages.
Microsoft Media Platform: Player Framework, "Microsoft Media Platform: Player Framework v2.5 (formerly Silverlight Media Framework)", Microsoft, May 3, 2011, 2 pages.
Morrison, "EA IFF 85, Standard for Interchange Format Files", Jan. 14, 1985, printed from http://www.dcs.ed.ac.uk/home/mxr/gfx/2d/IFF.txt on Mar. 6, 2006, 24 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.

Office Action for U.S. Appl. No. 13/224,298, dated May 19, 2014, 26 pages.
Office Action for U.S. Appl. No. 13/905,804, dated Jul. 25, 2014, 15 pages.
Open DML AVI-M-JPEG File Format Subcommittee, "Open DML AVI File Format Extensions", Version 1.02, Feb. 28, 1996, 29 pgs.
Qtv, "About BroadQ", 2009, printed May 11, 2009 from http://www.broadq.com/en/about.php, 1 pg.
Taxan, "A Vel LinkPlayer2 for Consumer, I-O Data Usa—Products—Home Entertainment", 2003, printed May 4, 2007 from http://www.iodata.com/usa/products/products.php?cat=HNP&sc=AVEL&pld=AVLP2/DVDLA&ts=2&tsc, 1 pg.
"Smooth Streaming Client", The Official Microsoft IIS Site, Sep. 24, 2010, 4 pages.
"Windows Media Center Extender for Xbox", Xbox, printed May 9, 2007 from http://www.xbox.com/en-US/support/systemuse/xbox/console/mediacenterextender.htm, 2 pgs.
Windows XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
Office Action for Chinese Patent Application No. CN200880127596.4, dated May 6, 2014, 15 pgs.
International Search Report and Written Opinion for International Application PCT/US14/30747, completed Jul. 30, 2014, dated Aug. 22, 2014, 7 pgs.
I-O Data, "Innovation of technology arrived", Nov. 2004, from http://www.iodata.com/catalogs/AVLP2DVDLA_Flyer200505.pdf, 2 pgs.
"Adaptive Streaming Comparison", Jan. 28, 2010, 5 pgs.
"Best Practices for Multi-Device Transcoding", Kaltura Open Source Video, 2013, Printed on Nov. 27, 2013 from knowledge.kaltura.com/best-practices-multi-device-transcoding, 13 pgs.
"Container format (digital)", Aug. 17, 2009, printed Aug. 22, 2009 from http://en.wikipedia.org/wiki/Container_format_(digital), 4 pgs.
"Diagram | Matroska", Dec. 17, 2010, Retrieved from http://web.archive.org/web/201 01217114656/http:l/matroska.org/technical/diagram/index.html on Jan. 29, 2016, 5 pages.
"DVD subtitles", sam.zoy.org/writings/dvd/subtitles, dated Jan. 9, 2001, printed Jul. 2, 2009, 4 pgs.
"DVD-Mpeg differences", http://dvd.sourceforge.net/dvdinfo/dvdmpeg.html, printed on Jul. 2, 2009, 1 pg.
"Final Committee Draft of MPEG-4 streaming text format", International Organisation for Standardisation, Feb. 2004, 22 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for . . . -a018239381, 6pg.
"Information technology—Coding of audio-visual objects—Part 18: Font compression and streaming", ISO/IEC 14496-18, First Edition, Jul. 1, 2004, 26 pgs.
"Matroska Streaming | Matroska", Dec. 17, 2010, Retrieved from http://web.archive.org/web/201 0121711431 O/http://matroska.org/technical!streaming/index.html on Jan. 29, 2016, 2 pages.
"Netflix turns on subtitles for PC, Mac streaming", Yahoo! News, Apr. 21, 2010, Printed on Mar. 26, 2014, 3 pgs.
"QCast Tuner for PS2", 2003, printed May 11, 2009 from http://web.archive.org/web/20030210120605/www.divx.com/software/detail.php? ie=39, 2 pgs.
"Specifications | Matroska", Jul. 6, 2010, Retrieved from http://web.archive.org/web/201 00706041303/http:/1 www.matroska.org/technical/specs/index.html on Jan. 29, 2016, 14 pages.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.

(56) References Cited

OTHER PUBLICATIONS

"Text of ISO/IEC 14496-18/FDIS", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"Thread: SSME (Smooth Streaming Medial Element) config.xml review (Smooth Streaming Client configuration file)", Aug. 10, 2011, Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, Feb. 11, 2014, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", 2009, retrieved from http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Author Unknown, "Blu-ray Disc—Blu-ray Disc—Wikipedia, the free encyclopedia", Oct. 30, 2008, printed Oct. 30, 2008 from http://en.wikipedia.org/wiki/Blu-ray_Disc, 11 pgs.
Author Unknown, "Blu-ray Movie Bitrates Here—Blu-ray Forum", 2008, printed Oct. 30, 2008 from http://forum.blu-ray.com/showthread.php?t=3338, 6 pgs.
Author Unknown, "MPEG-4 Video Encoder: Based on International Standard ISO/IED 14496-2", Patni Computer Systems, Ltd., printed Jan. 24, 2007, USA, pp. 1-15.
Author Unknown, "O'Reilly—802.11 Wireless Networks: The Definitive Guide, Second Edition", 2008, printed Oct. 30, 2008 from http://oreilly.com/catalog/9780596100520, 2 pgs.
Matroska, "Diagram", Matroska, Technical/Info, Diagram, 2016, retrieved from https://www.matroska.org/technical/diagram/index.html on Jul. 20, 2017, 9 pages.
Matroska, "Specifications", Matroska, Technical/Info, Specifications, Jun. 25, 2017, retrieved from https://www.matroska.org/technical/specs/index.html on Jul. 20, 2017, 20 pages.
Miras, "On Quality Aware Adaptation of Internet Video", University of London, PhD dissertation, 2004, 181 pgs.
Moscoso, Pedro Gomes, "Interactive Internet TV Architecture Based on Scalable Video Coding", Instituto Superior Techico, Universidad Technica de Lisboa, May 2011, 103 pgs.
Oyman et al, "Quality of Experience for HTTP Adaptive Streaming Services", IEEE Communications Magazine, Apr. 2012, vol. 50, No. 4, pp. 20-27, DOI: 10.1109/MCOM.2012.6178830.
Ozer, Jan, "Adaptive Streaming in the Field", Streaming Media, Dec. 2010-Jan. 2011, pp. 36-47.
Padiadpu, Rashmi, "Towards Mobile Learning: A SCORM Player for the Google Android Platform", Master Thesis, Hamburg University of Applied Sciences, 2008, 66 pgs.
Peek, David, "Consumer Distributed File Systems", Dissertation, Doctor of Philosophy, Computer Science and Engineering, The University of Michigan, 2009, 118 pgs.
Rosenberg et al., "Indicating User Agent Capabilities in the Session Initiation Protocol (SIP)", Network Working Group, RFC 3840, Aug. 2004, 36 pgs.
Silvio, "adaptive HTTP streaming for open codecs", Oct. 9, 2010, [retrieved on: Mar. 2, 2018.

Tripathi et al, "Improving Multimedia Streaming with Content-Aware Video Scaling", Retrieved from: http://digitalcommons.wpi.edu/computerscience-pubs/96, 2001, 17 pgs.
Venkatramani et al., "Securing Media for Adaptive Streaming", Multimedia 2003 Proceedings of the Eleventh ACM International Conference on Multimedia, Nov. 2-8, 2003, Berkeley, California, 4 pgs.
U.S. Appl. No. 13/905,804, "Notice of Allowance," dated Aug. 12, 2015, 8 pgs.
Final draft ETSI ES 202 109, V1.1.1, ETSI Standard, Terrestrial Trunked Radio (TETRA); Security; Synchronization mechanism for end-to-end encryption, Oct. 2002, 17 pgs.
International Preliminary Report for Application No. PCT/US2011/066927, Filed Dec. 22, 2011, Report dated Jul. 10, 2013, 13 pgs.
International Preliminary Report for International Application No. PCT/US2011/067243, International Filing Date Dec. 23, 2011, dated Jul. 10, 2013, 7 pgs.
International Preliminary Report on Patentability for International Application PCT/US2011/067167, dated Feb. 25, 2014, 8 pgs.
International Search Report and Written Opinion for International Application No. PCT/US2011/067243, International Filing Date Dec. 23, 2011, Search Completed Apr. 24, 2012, dated May 8, 2012, 8 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
3GPP TS 26.247, V1.3.0, 3rd Generation Partnership Project; Technical Specification Group Services and System Aspects Transparent end-to-end Packet-switches Streaming Services (PSS);, Progressive Download and Dynamic Adaptive Streaming over HTTP (3GP-DASH) (Release 10), Mar. 2011, 72 pgs.
"Draft CR: Trick Mode for HTTP Streaming", 3GPP TSG-SA4 Meeting #58, Apr. 26-30, 2010, Vancouver, Canada, S4-100237, 3 pgs.
"Information Technology—Coding of audio-visual objects—Part 14: MP4 file format", International Standard, ISO/IEC 14496-14, First Edition, Nov. 15, 2003, 18 pages.
"Information technology—Generic coding of moving pictures and associated audio information: Systems", International Standard ISO/IEC 13818-1, Second Edition, Dec. 1, 2000, 174 pages (presented in two parts).
"Information-Technology—Generic coding of moving pictures and associated audio: Systems, Recommendation H.222.0", International Standard, ISO/IEC 13818-1, Draft 1209, Apr. 25, 1995, 151 pages.
"Information-Technology—Generic coding of moving pictures and associated audio: Systems, Recommendation H.222.0", International Standard, ISO/IEC 13818-1, Draft 1540, Nov. 13, 1994, 161 pages.
"Matroska", Wikipedia, Jul. 10, 2017, retrieved from https://en.wikipedia.org/wiki/Matroska on Jul. 20, 2017, 3 pages.
"MovieLabs Specification for Next Generation Video—Version 1.0", Motion Picture Laboratories, Inc., 2013, Retrieved from: http://movielabs.com/ngvideo/MovieLabs%20Specification%20for%20Next%20Generation%20Video%20v1.0.pdf, 5 pgs.
"MPEG-2", Wikipedia, Jun. 13, 2017, retrieved from https://en.wikipedia.org/wiki/MPEG-2 on Jul. 20, 2017, 13 pages.
"MPEG-4 File Format, Version 2", Sustainability of Digital Formats: Planning for Library of Congress Collections, Retrieved from: https://www.loc.gov/preservation/digital/formats/fdd/fdd000155.shtml, Last updated Feb. 21, 2017, 8 pgs.
"MPEG-4 Part 14", Wikipedia, Jul. 10, 2017, retrieved from https://en.wikipedia.org/wiki/MPEG-4_Part_14 on Jul. 20, 2017, 5 pages.
"Series H: Audiovisual and Multimedia Systems Infrastructure of audiovisual services—Coding of moving video; High efficiency video coding", International Telecommunication Union, ITU-T H.265, Apr. 2015, 634 pages (presented in six parts).
"Specifications Matroska", Dec. 17, 2010, [retrieved on Mar. 2, 2018], 12 pages.
Adams et al, "Will http adaptive streaming become the dominant mode of video delivery in cable networks?", https://www.

(56) References Cited

OTHER PUBLICATIONS nctatechnicalpapers.com/Paper/2011/2011-will-http-adaptive-streaming-become-the-dominant-mode-of-video-delivery-in-cable-networks-, 10 pgs.

Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.

Adzic et al, "Optimized Adaptive HTTP Streaming for Mobile Devices", International Society for Optics and Photonics, Applications of Digital Image Processing XXXIV, vol. 8135, Sep. 2011, p. 81350T.

Bloom et al., "Copy Protection for DVD Video", Proceedings of the IEEE, vol. 87, No. 7, Jul. 1999, pp. 1267-1276.

Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013 (presented in three parts).

Concolato et al., "Live HTTP Streaming of Video and Subtitles within a Browser", MMSys 2013, Feb. 26-Mar. 1, 2013, Oslo, Norway, 5 pgs.

Eskicioglu et al., "An Integrated Approach to Encrypting Scalable Video", Proceedings IEEE International Conference on Multimedia and Expo, Aug. 26-29, 2002, Lausanne, Switzerland, 4 pgs.

Fecheyr-Lippens, "A Review of HTTP Live Streaming", Internet Citation, Jan. 25, 2010, pp. 1-37.

Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.

Hurtado Guzman, Juan Esteban, "Development and Implementation of an Adaptive HTTP Streaming Framework for H264/MVC Coded Media", Politecnico di Torino, Nov. 2010, 108 pgs.

Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, pp. 131-140.

Li et al, "Content-Aware Playout and Packet Scheduling for Video Streaming Over Wireless Links", IEEE Transactions on Multimedia, vol. 10, No. 5, Aug. 2008, pp. 885-895.

Lian et al., "Efficient video encryption scheme based on advanced video coding", Multimed. Tools Appl. vol. 38, 2008, pp. 75-89.

Liu et al., "A Formal Framework for Component Deployment", OOPSLA 2006, Proceedings of the 21st Annual ACM SIGPLAN Conference on Object-Oriented Programming Systems, Language, and Applications, Portland, Oregon, Oct. 22-26, 2006, pp. 325-344.

* cited by examiner

SYSTEMS, METHODS, AND MEDIA FOR CONTROLLING DELIVERY OF CONTENT

CROSS-REFERENCE TO RELATED APPLICATIONS

The current application is a continuation of U.S. patent application Ser. No. 13/732,140 entitled "Systems, Methods, and Media for Controlling Delivery of Content" to van der Schaar et al., filed Dec. 31, 2012, and issued on Nov. 17, 2015 as U.S. Pat. No. 9,191,457, entitled "Systems, Methods, and Media for Controlling Delivery of Content", the disclosure of which is hereby incorporated by reference in its entirety.

BACKGROUND OF THE INVENTION

Consumers of media content, such as movies, television programs, and short videos, are increasingly streaming media content over the Internet to client devices, such as laptops, smart TVs, and streaming media players. Typically, when online streaming is used, media content is constantly received in blocks and rendered on the client devices as the blocks are received. Online streaming may thus generate a higher bandwidth usage than other online activities.

When performed inefficiently, online streaming may waste network resources. For instance, network infrastructure may be under-utilized in situations where blocks of streamed content are requested one-by-one. In such situations, a client device may transmit a first request, receive a response, and transmit a second request only after the response to the first request is received. Streaming content in this manner may result in a network throughput that is below the network's bandwidth.

SUMMARY OF THE INVENTION

In some embodiments, a system for controlling delivery of content is provided. The system includes processing circuitry configured to: transmit, to a server, a plurality of requests for blocks of the content; while at least some of the plurality of requests are still outstanding: detect a change of a service characteristic of a connection between the system and the server; determine a preferred number of outstanding requests; and cancel at least some of the requests from the plurality that are still outstanding based on the preferred number and a count of the requests from the plurality that are still outstanding.

In some embodiments, a system for presenting media content using cached assets is provided. The system includes processing circuitry configured to: transmit to a server a plurality of requests for blocks of a content, the plurality including a first request for a first block of the content and a second request for a second block of the content; while the second request is still outstanding: receive a first block of the content responsive to the first request; determine a preferred number of outstanding requests; and when the preferred number of outstanding requests is greater than the number of requests from the plurality that are currently outstanding, transmit a third request for a third block before the second block is received by the processing circuitry; otherwise, when the preferred number of outstanding requests is less than or equal to the number of requests from the plurality that are currently outstanding, transmit the third request after the second block is received by the processing circuitry.

In some embodiments, a method for controlling delivery of content is provided, the method comprising: transmitting a plurality of requests for blocks of the content to a server; while at least some of the plurality of requests are still outstanding: detecting a change of a service characteristic of a connection with a server; determining, by a processing circuitry, a preferred number of outstanding requests; and cancelling at least some of the requests from the plurality that are still outstanding based on the preferred number and a count of the requests from the plurality that are still outstanding.

In some embodiments, a method for controlling delivery of content is provided, the method comprising: transmitting, by a device to a server, a plurality of requests for blocks of a content, the plurality including a first request for a first block of the content and a second request for a second block of the content; while the second request is still outstanding: receiving a first block of the content responsive to the first request; determining a preferred number of outstanding requests; and when the preferred number of outstanding requests is greater than the number of requests from the plurality that are currently outstanding, transmitting a third request for a third block of the content before the second block is received at the device; otherwise, when the preferred number of outstanding requests is less than or equal to the number of requests from the plurality that are currently outstanding, transmitting the third request after the second block is received at the device.

In some embodiments, a non-transitory computer-readable medium is provided that contains computer-executable instructions. The computer-executable instructions, when executed by a processing circuitry, cause the processing circuitry to perform a method for controlling delivery of content, the method comprising: transmitting a plurality of requests for blocks of the content to a server; while at least some of the plurality of requests are still outstanding: detecting a change of a service characteristic of a connection with a server; determining a preferred number of outstanding requests; and cancelling at least some of the requests from the plurality that are still outstanding based on the preferred number and a count of the requests from the plurality that are still outstanding.

In some embodiments, a non-transitory computer-readable medium is provided that contains computer-executable instructions. The computer-executable instructions, when executed by a processing circuitry, cause the processing circuitry to perform a method for controlling delivery of content, the method comprising: transmitting to a server a plurality of requests for blocks of a content, the plurality including a first request for a first block of the content and a second request for a second block of the content; while the second request is still outstanding, receiving a first block of the content responsive to the first request; determining a preferred number of outstanding requests; and when the preferred number of outstanding requests is greater than the number of requests from the plurality that are currently outstanding, transmitting a third request for a third block of the content before the second block is received at the device; when the preferred number of outstanding requests is less than or equal to the number of requests from the plurality that are currently outstanding, transmitting the third request after the second block is received at the device.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

This invention generally relates to systems, methods, and media for controlling delivery of content. In some embodiments, a technique for controlling delivery content is provided. In accordance with the technique, multiple requests for blocks of the streamed content may be issued simultaneously, or nearly simultaneously, by a client device without waiting for the receipt of a response to any of the requests. The requests may be received at a server and served in the order of their arrival. Requests that have been transmitted by the client, but for which a response has not been received may be referred to as outstanding requests.

In some embodiments, the number of outstanding requests may be dynamically increased in dependence upon predetermined criterion/or criteria. Furthermore, in some embodiments, the number of outstanding request may be dynamically reduced in response to predetermined criterion/or criteria. The number of outstanding requests may be reduced by cancelling some of the outstanding requests. Dynamically reducing and/or increasing the number of outstanding requests may enable the systems, methods, and media to react to unexpected events, such as increase/decrease of available network bandwidth leading to the occurrence of underflow conditions, and/or any other suitable event.

As referred to herein, the term "media content" or "content" should be understood to mean one or more electronically consumable media assets, such as television programs, pay-per-view programs, on-demand programs (e.g., as provided in video-on-demand (VOD) systems), Internet content (e.g., streaming content, downloadable content, Webcasts, etc.), movies, films, video clips, audio, audio books, and/or any other media or multimedia and/or combination of the same. As referred to herein, the term "multimedia" should be understood to mean media content that utilizes at least two different content forms described above, for example, text, audio, images, video, or interactivity content forms. Media content may be recorded, played, displayed or accessed by user equipment devices, but can also be part of a live performance. In some embodiments, media content can include over-the-top (OTT) content. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC.

Media content can be provided from any suitable source in some embodiments. In some embodiments, media content can be electronically delivered to a user's location from a remote location. For example, media content, such as a Video-On-Demand movie, can be delivered to a user's home from a cable system server. As another example, media content, such as a television program, can be delivered to a user's home from a streaming media provider over the Internet.

Figure 1:
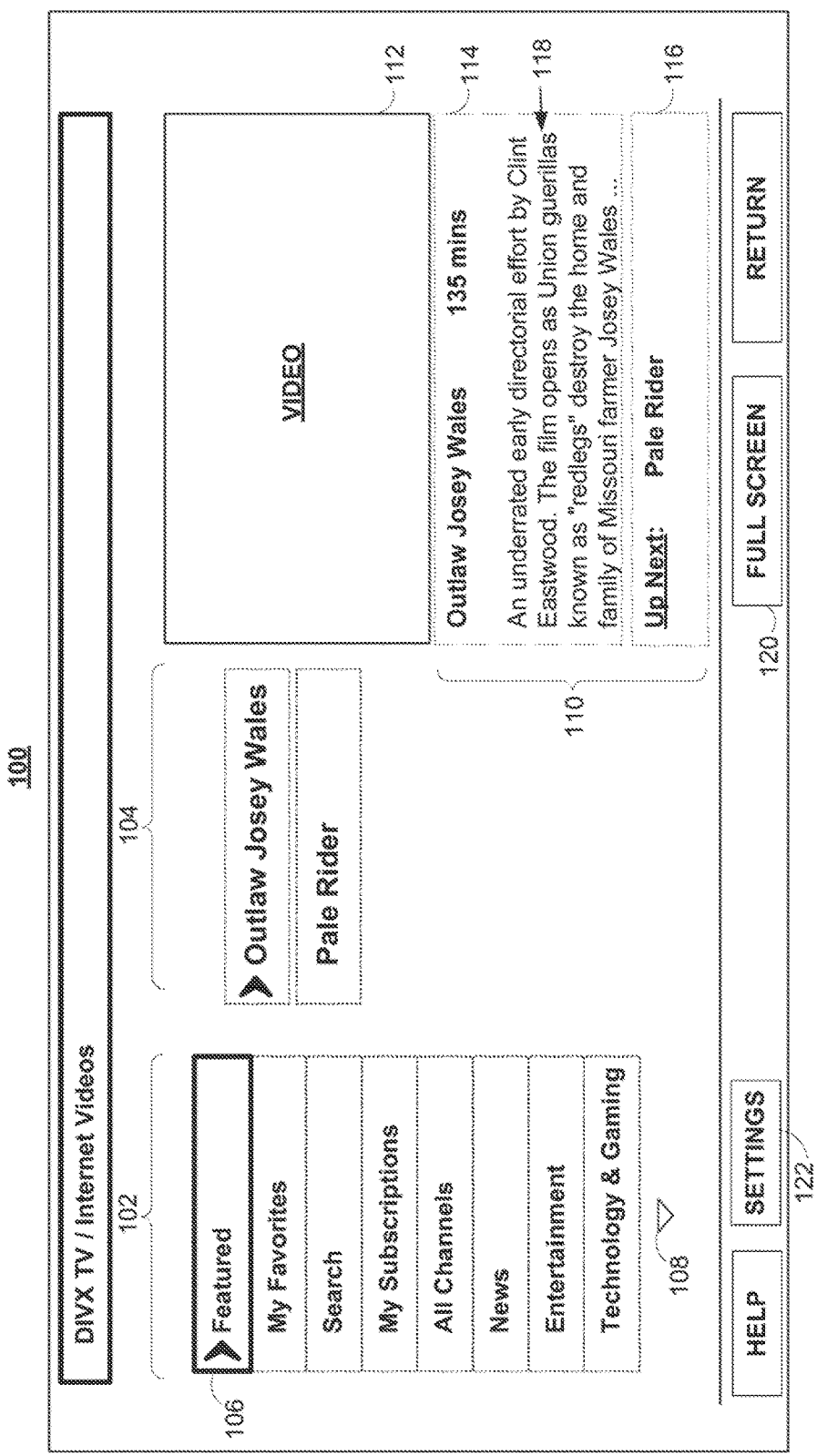
FIG. 1 shows an example of an interactive media guidance application display that can be used with a process for selecting media content for presentation in accordance with some embodiments of the invention.

FIG. 1 shows an example 100 of a guidance display that can be provided as part of an interactive media guidance application in accordance with some embodiments. As illustrated, a user may be presented with display 100 in response to the user selecting a selectable option provided in a displayed menu (e.g., an "Internet Videos" option, a "DivXTV" option, a "Program Listings" option, etc.), pressing a dedicated button (e.g., a GUIDE button) on a user input interface or device, and/or taking any other suitable action.

As illustrated in FIG. 1, guidance display 100 may include lists of media identifiers, such as a first list of media identifiers 102 that lists categories of media content, and a second list of media identifiers 104 that lists particular pieces of media content within a selected category that are available for presentation.

Additional media guidance data, such as additional media identifiers, may be presented in response to a user selecting a navigational icon 108.

Display 100 may also include a media queue region 110 that lists one or more pieces of media content selected and queued for playback, and a video region 112 in which pieces of media content can be presented.

In some embodiments, information relating to a piece of media content can also be presented to a user. For example, information 118 can include a name of a piece of media content, a time at which the media content is available (if applicable), a source (e.g., channel, Web address, etc.) from which the media content can be obtained, a parental rating for the piece of media content, a duration of the piece of media content, a description of the piece of media content, a review or a quality rating of the piece of media content, and/or any other suitable information.

In some embodiments, pieces of media content can be played in a full sized display screen in response to a user selecting "full screen" button 120.

In some embodiments, a user may be able to set settings related to the interactive media guidance application by pressing a settings button, such as settings button 122 of FIG. 1. The settings that can be set can include any suitable settings such as channel and program favorites, programming preferences that the guidance application can utilize to make programming recommendations, display preferences, language preferences, and/or any other suitable settings.

Figure 2:
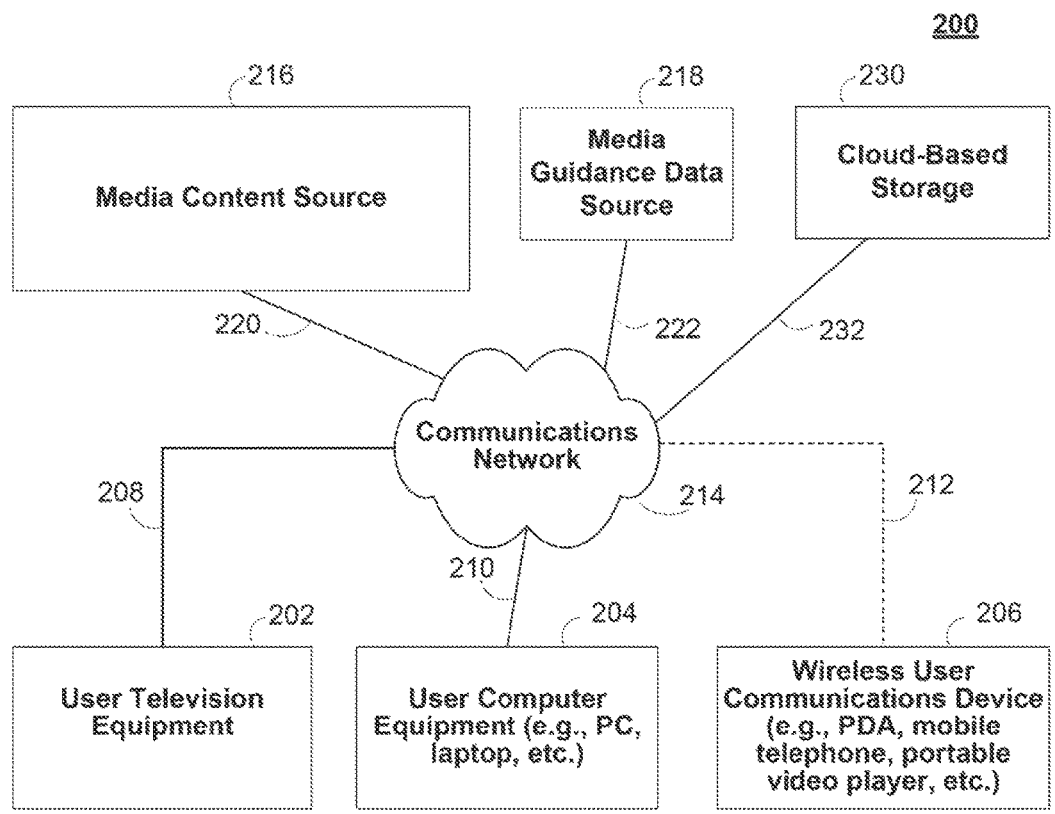
FIG. 2 shows an example of a block diagram of hardware that can be used in accordance with some embodiments of the invention.

Turning to FIG. 2, an example 200 of an architecture of hardware that can be used in accordance with some embodiments is shown. As illustrated, architecture 200 can include a user television equipment device 202, a user computer equipment device 204, a wireless user communication device 206, a communications network 214, a media content source 216, a media guidance data source 218, cloud-based storage 230, and communication paths 208, 210, 212, 220, 222, and 232, in some embodiments.

In some embodiments, user television equipment device 202, user computer equipment device 204, and wireless user communication device 206, which can each be referred to herein as a "user equipment device," can be any suitable devices for presenting media content, presenting an interactive media guidance application for selecting content, and/or performing any other suitable functions as described herein.

User television equipment device 202 can be any suitable user television equipment device or devices in some embodiments. For example, in some embodiments, user television equipment device 202 can include any suitable television, smart TV, set-top box, integrated receiver decoder (IRD) for handling satellite television, digital storage device, digital media receiver (DMR), digital media adapter (DMA), streaming media device, DVD player, DVD recorder, connected DVD, local media server, BLU-RAY player, BLU-RAY recorder, any other suitable user television equipment, and/or any suitable combination of the same.

User computer equipment 204 can be any suitable user computer equipment in some embodiments. For example, in some embodiments, user computer equipment 204 can include any suitable personal computer (PC), laptop computer, tablet computer, WebTV box, personal computer television (PC/TV), PC media server, PC media center, hand-held computer, stationary telephone, non-portable gaming machine, any other suitable user computer equipment, and/or any other suitable combination of the same.

Wireless user communication device 206 can be any suitable wireless user communication device or devices in some embodiments. For example, in some embodiments, wireless user communication device 206 can include any suitable personal digital assistant (PDA), mobile telephone, portable video player, portable music player, portable gaming machine, smart phone, any other suitable wireless device, and/or any suitable combination of the same.

In some embodiments, user equipment devices may be connectable to a communications network. For example, in some embodiments, user equipment devices may be Internet-enabled allowing them to access Internet media content.

In some embodiments, communications network 214 may be any one or more networks including the Internet, a mobile phone network, a mobile voice network, a mobile data network (e.g., a 3G, 4G, or LTE network), a cable network, a satellite network, a public switched telephone network, a local area network, a wide area network, any other suitable type of communications network, and/or any suitable combination of communications networks.

Media content source 216 may include one or more types of content distribution equipment for distributing any suitable media content, including television distribution facility equipment, cable system head-end equipment, satellite distribution facility equipment, programming source equipment (e.g., equipment of television broadcasters, such as NBC, ABC, HBO, etc.), intermediate distribution facility equipment, Internet provider equipment, on-demand media server equipment, and/or any other suitable media content provider equipment, in some embodiments. NBC is a trademark owned by the National Broadcasting Company, Inc., ABC is a trademark owned by the American Broadcasting Companies, Inc., and HBO is a trademark owned by the Home Box Office, Inc.

Media content source 216 may be operated by the originator of content (e.g., a television broadcaster, a Webcast provider, etc.) or may be operated by a party other than the originator of content (e.g., an on-demand content provider, an Internet provider of content of broadcast programs for downloading, etc.), in some embodiments.

Media content source 216 may be operated by cable providers, satellite providers, on-demand providers, Internet providers, providers of over-the-top content, subscription providers, rental providers, and/or any other suitable provider(s) of content, in some embodiments.

Media content source 216 may include a remote media server used to store different types of content (including video content selected by a user), in a location remote from any of the user equipment devices, in some embodiments. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide any suitable media guidance data, such as names of pieces of media content, times at which the media content is available (if applicable), sources (e.g., channels, Web addresses, etc.) from which the media content can be obtained, parental ratings for the pieces of media content, durations of the pieces of media content, descriptions of the pieces of media content, reviews or quality ratings of the pieces of media content, and/or any other suitable information, in some embodiments.

Media guidance data may be provided by media guidance data source 218 to the user equipment devices using any suitable approach, in some embodiments. In some embodiments, for example, an interactive media guidance application may be a stand-alone interactive television program guide that receives this media guidance data from media guidance data source 218 via a data feed (e.g., a continuous feed or trickle feed). In some embodiments, this media guidance data may be provided to the user equipment on a television channel sideband, using an in-band digital signal, using an out-of-band digital signal, or by any other suitable data transmission technique from media guidance data source 218. In some embodiments, this media guidance data may be provided to user equipment on multiple analog or digital television channels from media guidance data source 218. In some embodiments, media guidance data from media guidance data source 218 may be provided to users' equipment using a client-server approach, wherein media guidance data source 218 acts as a server.

Cloud-based storage 230 can be any suitable storage for storing any suitable content, data, licenses, etc. so that it is accessible via communication network 214, in some embodiments. In some embodiments, cloud-based storage 230 can be virtualized pools of storage hosted in an Internet data center, such as the Amazon S3 storage provided by Amazon Web Services of Herndon, Va., USA. In some embodiments, cloud-based storage 230 can be used to "locally" cache media content for presentation on user equipment devices 202, 204, and/or 206 rather than store that content in user equipment devices 202, 204, and/or 206.

Although only one each of user equipment devices 202, 204, and/or 206, sources 216 and 218, and storage 230 are illustrated in FIG. 2 in order to avoid over complicating the drawing, any suitable number of each of these components can be provided in some embodiments.

Each user may utilize more than one type of user equipment device in some embodiments. In some embodiments, any of user equipment devices 202, 204, and 206 can be combined, and any of sources 216 and 218 can be combined.

Paths 208, 210, 212, 220, 222, and 232 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths, in some embodiments. Path 212 is drawn with dotted lines to indicate that, in the exemplary embodiment shown in FIG. 2, it can be a wireless path (although this path may be a wired path, if desired), and paths 208, 210, 220, 222, and 232 are drawn as solid lines to indicate they can be wired paths (although these paths may be wireless paths, if desired). In some embodiments, communication to/from user equipment devices 202, 204, and 206, sources 216 and 218, and storage 230 may be provided by one or more of communications paths 208, 210, 212, 220, 222, and 232, respectively, but are shown as a single path in FIG. 2 to avoid overcomplicating the drawing.

Although communications paths are not drawn between user equipment devices 202, 204, and 206, sources 216 and 218, and storage 230, these components may communicate directly with each other via communication paths, such as those described above, as well via point-to-point communication paths, such as USB cables, IEEE 1394 cables, wireless paths (e.g., Bluetooth, infrared, IEEE 802.11x, etc.), or other communication via wired or wireless paths, in some embodiments. BLUETOOTH is a certification mark owned by Bluetooth SIG, INC. The user equipment devices 202, 204, and 206, sources 216 and 218, and storage 230 may also communicate with each other directly through an indirect path via communications network 214, in some embodiments.

In some embodiments, sources 216 and 218 and storage 230 can be implemented in any suitable hardware. For example, sources 216 and 218 and storage 230 can be implemented in any of a general purpose device such as a computer or a special purpose device such as a client, a server, mobile terminal (e.g., mobile phone), etc. Any of these general or special purpose devices can include any suitable components such as a hardware processor (which can be a microprocessor, digital signal processor, a controller, etc.).

Figure 3:
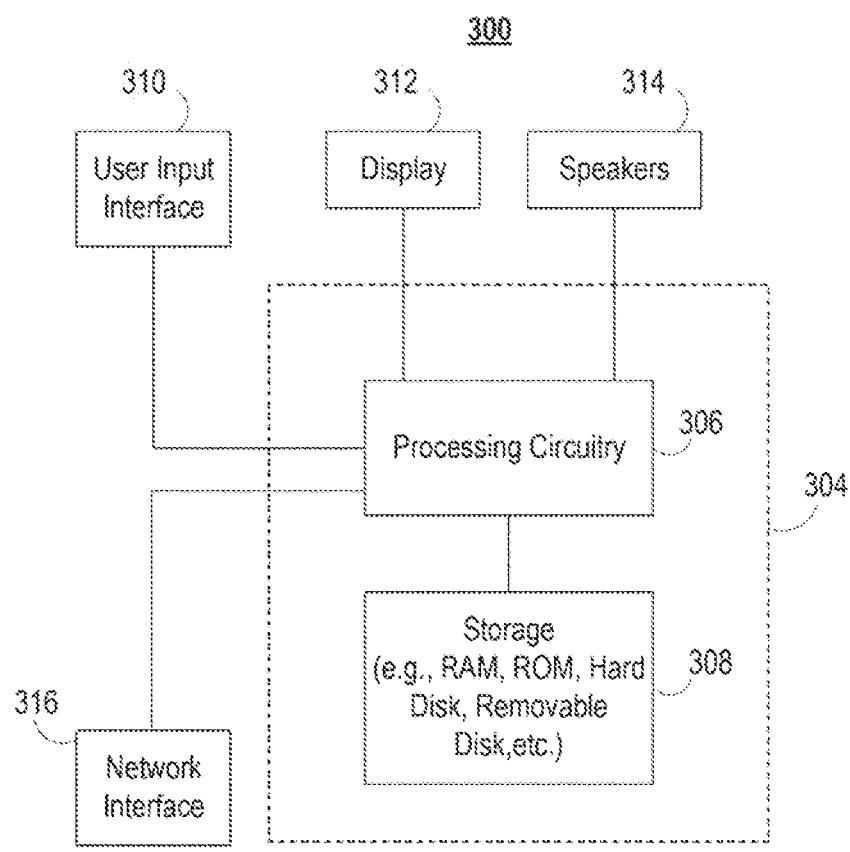
FIG. 3 shows an example of a block diagram of user equipment device hardware that can be used in accordance with some embodiments of the invention.

FIG. 3 shows an example of hardware that can be provided in an illustrative user equipment device 300, such as user television equipment device 202, user computer equipment device 204, and/or wireless user communication device 206 of FIG. 2, in accordance with some embodiments. As illustrated, device 300 can include control circuitry 304 (which can include processing circuitry 306 and storage 308), a user input interface 310, a display 312, speakers 314, and an input/output (hereinafter "I/O") interface 316, in some embodiments.

Control circuitry 304 may include any suitable processing circuitry such as processing circuitry 306. As referred to herein, processing circuitry 306 can be circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Storage 308 can be any suitable digital storage mechanism in some embodiments. For example, storage 308 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions), in some embodiments. Cloud-based storage may be used to supplement storage 308 or instead of storage 308 in some embodiments.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits, in some embodiments. Encoding circuitry (e.g., for converting over-the-air, analog, or digital signals to MPEG signals for storage) may also be provided, in some embodiments. Control circuitry 304 may also include scaler circuitry for upconverting and downconverting content into the preferred output format of the user equipment 300, in some embodiments. Circuitry 304 may also include digital-to-analog converter circuitry and analog-to-digital converter circuitry for converting between digital and analog signals. The video generating circuitry may be used for presenting media content, in some embodiments. The tuning and encoding circuitry may be used by the user equipment device to receive and to display, to play, or to record content, in some embodiments. The tuning and encoding circuitry may also be used to receive guidance data, in some embodiments. The circuitry described herein, including for example, the tuning, video generating, encoding, decoding, encrypting, decrypting, scaler, and analog/digital circuitry, may be implemented using software running on one or more general purpose or special purpose hardware processors, in some embodiments. Multiple tuners may be provided to handle simultaneous tuning functions (e.g., watch and record functions, picture-in-picture (PIP) functions, multiple-tuner recording, etc.), in some embodiments. If storage 308 is provided as a separate device from user equipment 300, the tuning and encoding circuitry (including multiple tuners) may be associated with storage 308, in some embodiments.

A user may send instructions to control circuitry 304 using user input interface 310, in some embodiments. User input interface 310 may be any suitable user interface, such as a remote control, mouse, trackball, keypad, keyboard, touch screen, touchpad, stylus input, joystick, voice recognition interface, or other user input interfaces, in some embodiments.

Display 312 may be provided as a stand-alone device or integrated with other elements of user equipment device 300, in some embodiments. Display 312 may be one or more of a monitor, a television, a liquid crystal display (LCD) for a mobile device, or any other suitable equipment for dis-playing visual images, in some embodiments. In some embodiments, display 312 may be HDTV-capable. In some embodiments, display 312 may be a 3D display.

A video card or graphics card may generate the output to display 312, in some embodiments. The video card may offer various functions such as accelerated rendering of 3D scenes and 2D graphics, MPEG-2/MPEG-4 decoding, TV output, or the ability to connect multiple monitors, in some embodiments. The video card may be any processing circuitry described above in relation to control circuitry 304, in some embodiments. The video card may be integrated with the control circuitry 304 or may be integrated with display 312, in some embodiments.

Speakers 314 may be provided as integrated with other elements of user equipment device 300 or may be stand-alone units, in some embodiments. The audio component of media content displayed on display 312 may be played through speakers 314, in some embodiments. In some embodiments, the audio may be distributed to a receiver (not shown), which processes and outputs the audio via speakers 314.

I/O interface 316 can be any suitable I/O interface 316 in some embodiments. For example, in some embodiments, I/O interface 316 can be any suitable interface for coupling control circuitry 304 (and specifically processing circuitry 306) to one or more communications paths (e.g., paths 208, 210, and 212 described in FIG. 2). More particularly, for example, I/O interface 316 can include a cable modem, an integrated services digital network (ISDN) modem, a digital subscriber line (DSL) modem, a telephone modem, an Ethernet card, a fiber-optic modem, a wireless modem, and/or any other suitable communications circuitry. In some embodiments, the I/O interface can be used to provide content and data from an external location to device 300. For example, in some embodiments, I/O interface 316 can be used to provide media content (e.g., broadcast programming, on-demand programming, Internet content, content available over a local area network (LAN) or wide area network (WAN), and/or any other suitable content), media guidance data, subtitles, time codes, and/or any other suitable information or data to control circuitry 304 of device 300. In some embodiments, I/O interface 316 can also be used to send and receive commands, requests, and other suitable data from and to, respectively, control circuitry 304. Any suitable number of I/O interfaces 316 can be provided, even though only one is shown in FIG. 3 to avoid overcomplicating the drawing.

The processes for playing back media content, the interactive media guidance application and/or any other suitable functions as described herein may be implemented as stand-alone applications on user equipment devices in some embodiments. For example, the processes for playing back media content and/or the interactive media guidance application may be implemented as software or a set of executable instructions which may be stored in storage 308, and executed by control circuitry 304 of a user equipment device 300.

In some embodiments, the processes for playing back media content, the interactive media guidance application, and/or any other suitable functions as described herein may be implemented as client-server applications. In such client-server applications, a client application may reside on a user equipment device, and a server application may reside on a remote server, such as source 216. For example, the processes for playing back media content may be implemented partially as a client application on control circuitry 304 of user equipment device 300 and partially as a server application on media content source 216. As another example, an interactive media guidance application may be implemented partially as a client application on control circuitry 304 of user equipment device 300 and partially on a remote server (e.g., media guidance data source 218 of FIG. 2) as a server application running on control circuitry of the remote server.

Figure 4:
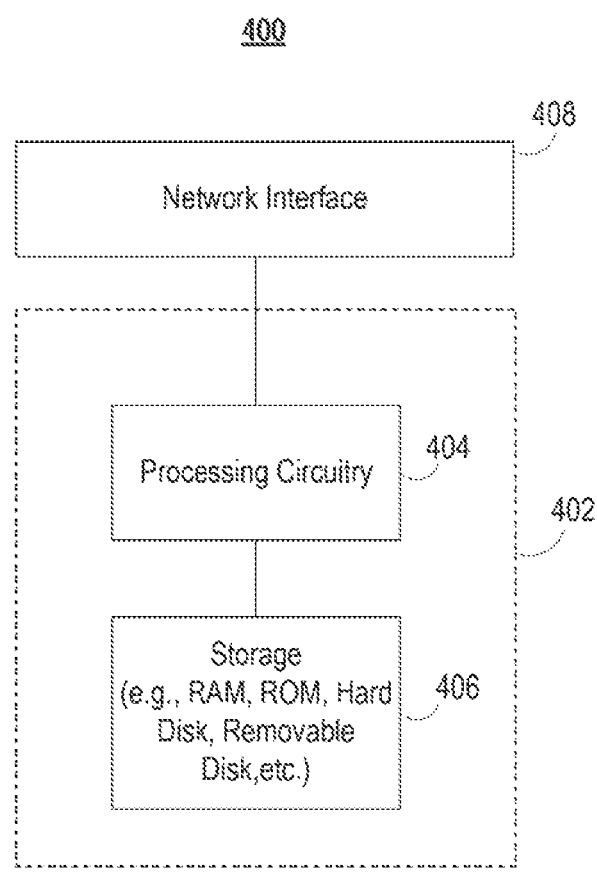
FIG. 4 shows an example of a block diagram of server hardware that can be used in accordance with some embodiments of the invention.

FIG. 4 shows an example of hardware that can be provided in an illustrative server 400. Server 400 may be part of a media content source, such as media content source 216, and it may implement a media content delivery process, such as content delivery process 236. As illustrated, server 400 can include control circuitry 402 (which can include processing circuitry 404 and storage 406) and a network interface 408.

Control circuitry 402 may include any suitable processing circuitry such as processing circuitry 404. As referred to herein, processing circuitry 404 can be circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Storage 406 can be any suitable digital storage mechanism in some embodiments. For example, storage 406 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 406 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions). Cloud-based storage may be used to supplement storage 406 or instead of storage 406 in some embodiments.

Control circuitry 402 may include encoding circuitry for encoding media content (e.g., video or audio). Control circuitry 402 may also include adaptive bit streaming circuitry for encoding the media content into multiple bit rates and performing switches between the streams during normal playback based upon the streaming conditions. Control circuitry 402 may also include streaming circuitry for transmitting the different bit streams via network interface 408.

For example, in some embodiments, interface 408 can be any suitable interface for coupling control circuitry 402 (and specifically processing circuitry 404) to one or more communications networks. More particularly, for example, interface 408 can include a cable modem, an integrated services digital network (ISDN) modem, a digital subscriber line (DSL) modem, a telephone modem, an Ethernet card, a fiber-optic modem, a wireless modem, and/or any other suitable communications circuitry. In some embodiments, the I/O interface can be used by server 400 to stream content to a client device, such as device 300. More particularly, in some embodiments, interface 408 can be used to provide media content (e.g., broadcast programming, on-demand programming, Internet content, content available over a local area network (LAN) or wide area network (WAN), and/or any other suitable content). In some embodiments, interface 408 can also be used to receive commands, requests, from a client device. Such requests may be for blocks (e.g., chunks) of media content that is being streamed.

Figure 5A:
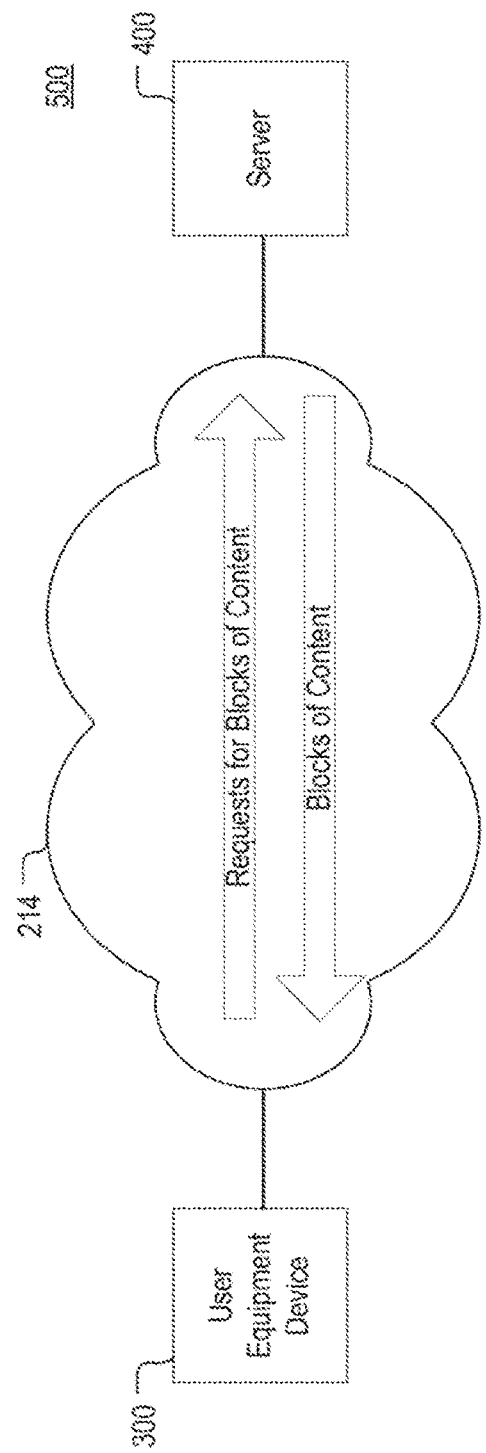
FIG. 5A shows an example of a block diagram of a system for streaming of content over a communications network in accordance with some embodiments of the invention.

FIG. 5A depicts an example of a system 500 that is operable to stream content from server 400 to device 300. In this example, a connection is established between device 300 and server 400 over a communications network (e.g., communications network 214) and used to stream content from the server to device 300. The connection may be based on any suitable Open Systems Interconnect (OSI) application-layer protocol, such as HTTP 1.1. Furthermore, the streamed content may be encoded using any suitable encoding scheme, such as MPEG.

In operation, device 300 may transmit to server 400 requests for blocks of the content that is being streamed. Each request may be for a different block of the content. Each block of the content may be a fragment of a larger content file (e.g., a video file or an audio file) that is stored on the server. Furthermore, each block of content may have a size (e.g., 2 MB) and be associated with a bit rate (e.g., compression level) at which the content is encoded. The size and the content may be varied by device 300, in some embodiments. In some embodiments, each block may carry several seconds (e.g two (2) seconds) of playable content (e.g., video or audio).

In operation, server 400 may receive requests for blocks of content from a number of devices, including device 300. Depending on the time it takes a message to travel from the client to the server over the network and on the rate at which requests from various devices are arriving at the server, there might be a considerable delay between server 400 receiving a request for a block of content from device 300 and server 400 transmitting a response back to device 300 and when the client receives the response The larger the delay, the greater the latency of the connection between server 400 and device 300.

When requested blocks of content arrive at device 300, they may be stored in a memory buffer. The memory buffer may reside on device 300 or elsewhere. The memory buffer may be implemented as a first-in-first-out (FIFO) structure from which blocks of content are removed in the order of their arrival, decoded, and output for presentation to a user (e.g., via a display screen or a speaker). In order to ensure uninterrupted streaming of the content, blocks of the content should arrive in the buffer at a rate that is the same or greater than the rate at which the blocks are removed from the buffer. The rate at which the blocks are removed (e.g., the consumption rate of the content) relates to the presentation rate.

The connection between server 400 and device 300 must have sufficient small latency and sufficiently high bandwidth in order to ensure a proper quality of the streaming. The latency of the connection, in some embodiments, may be equal to the time differential between the transmission of a request for a block of content by the client device to server 400 and the receipt of the first network packet associated with the block of content at device 300. The bandwidth of the connection, in some embodiments, may be equal to the size of the block divided by the time differential between the receipt of the first and last network packet associated with a block of content The bandwidth of the connection may thus be based solely on the state of the network components (e.g., switches and bridges) that form the communications path(s), whereas the latency may also account for any delay in the serving of the requests that is attributable to server 400 and the network path chosen to deliver the content.

To increase the rate at which the connection is utilized, device 300 may use a technique herein referred to as pipelining. In some cases, pipelining multiple requests leads to lowering buffering delays and hence faster startup times. In accordance with this technique, device 300 may issue multiple requests simultaneously, or nearly simultaneously, before waiting for receipt of responses to any of the requests. The pipelining technique may increase the utilization rate by overlapping latency with simultaneous data download (e.g., throughput) of the connection between server 400 and device 300.

Figure 5B:
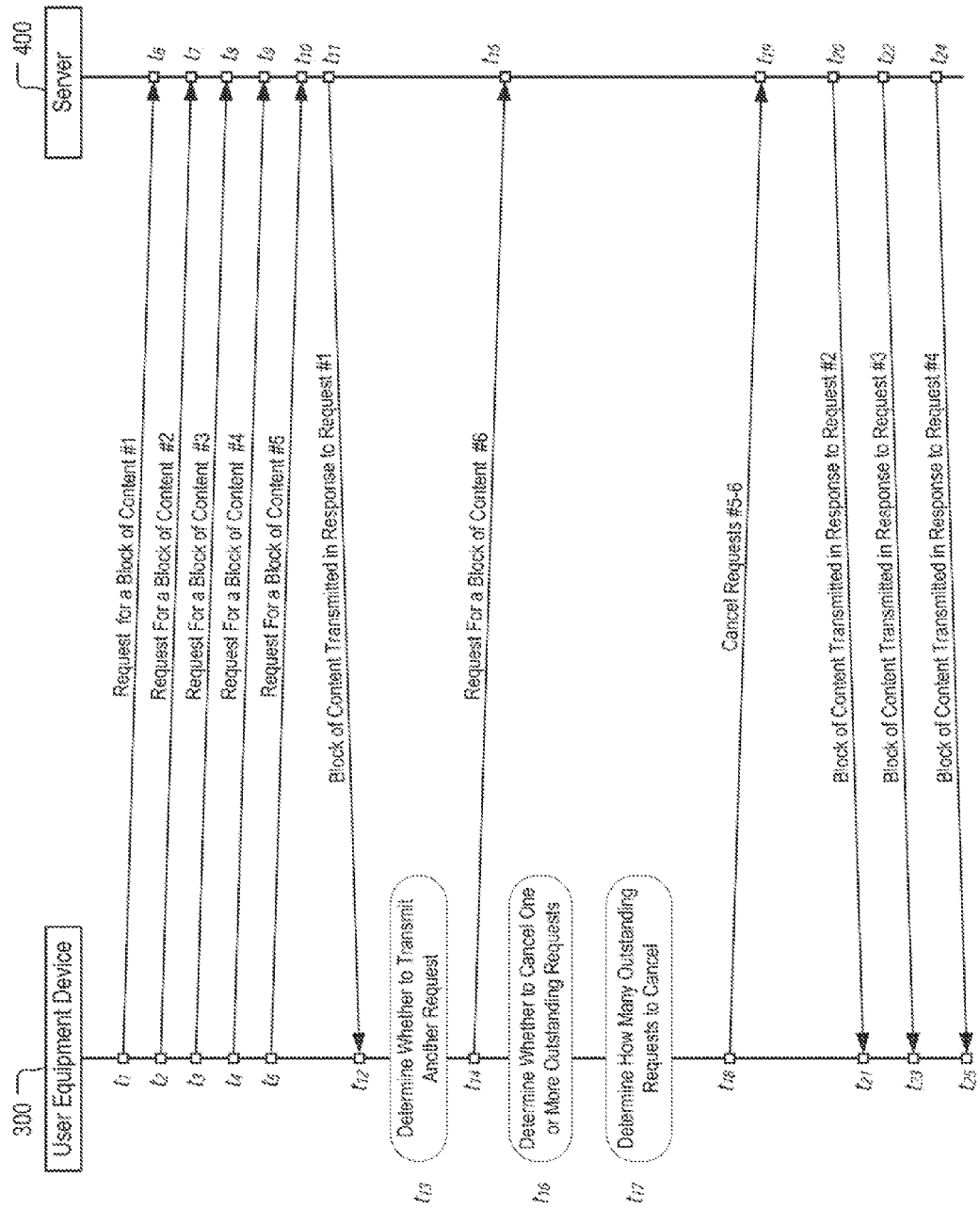
FIG. 5B shows an example of a sequence diagram of communications that take place between a user equipment device and a server in accordance with some embodiments of the invention.

FIG. 5B depicts a sequence diagram illustrating a set of interactions between device 300 and server 400 that may take place when pipelining is used. As illustrated, at times $t_1$-$t_5$, device 300 transmits Requests 1-5, respectively nearly simultaneously. Each one of the requests is for a different block of the content that is streamed. The requests are received at server 400 at times $t_6$-$t_{10}$, respectively. At time $t_{11}$, server 400 transmits a response to Request 1. As illustrated, the response may include multiple packets transmitted at times $t_{11a}$-$t_{11c}$, respectively. Each packet may carry a different portion of the request block of content. The first packet of the response (e.g., packet A) is received at device 300 at time $t_{12a}$ and the last packet from the response (e.g., packet C) is received at time $t_{12c}$. In view of the above, in this example, the latency of the connection between device 300 and server 400 is equal to the duration of the time period $t_1$-$t_{12a}$ The bandwidth of the connection, on the other hand, is based on the duration of the time period $t_{12c}$-$t_{12a}$.

At time $t_{13}$, device 300 can determine whether to increase the number of requests that are currently outstanding. In some embodiments, a request for a block of content may be considered outstanding if the request has been transmitted by device 300, but the requested block of content has not yet been received by device 300. In other embodiments, a request for a block of content may be considered outstanding if the request has been transmitted by device 300, but the block of content has not yet been transmitted by server 400. In this example, at time $t_{13}$, Requests 2-5 are currently outstanding.

In some embodiments, device 300 may determine a preferred number of outstanding requests based on one or more service characteristics of the connection between device 300 and server 400. If the preferred number is greater than the number of requests that are currently outstanding, device 300 may transmit one or more additional requests in order to reach the preferred number.

In some embodiments, the preferred number of outstanding requests may be determined as follows:

$$\text{preferred\_number\_of\_requests} = \left\lceil \frac{t_{latency}}{t_{transmission}} \right\rceil + 1 \qquad \text{(Eq. 1)}$$

where, $t_{latency}$ is the latency (e.g., in seconds) of the connection between server 400 and device 300 and $t_{transmission}$ is the time that is expected to take for a block of the content to be carried from server 400 to device 300 by one or more communications path(s) connecting server 400 to device 300. In some embodiments, $t_{transmission}$ may be calculated as follows:

$$t_{transmission} = \frac{\text{block size}}{\text{bandwidth}} \quad \text{(Eq. 2)}$$

where, "block size" is the size of a requested block of the content (e.g., in Mbits) and bandwidth is the bandwidth of the connection—namely, the bandwidth, or expected bandwidth, of communications path(s) connecting device 300 to server 400 (e.g., in Mbits/sec). When the number of outstanding request is large enough, the server will continuously keep sending data to the client as there is always an outstanding (non-served) request available and the network is fully utilized.

It should be noted that any number of suitable criteria for determining the preferred number of outstanding requests may be used. For example, criteria that are similar to the policy rules R1-R9 discussed below may be used to determine the preferred number based on one or more of size of blocks that are being requested, number of requests that are currently outstanding, bit rate at which the content in the blocks is encoded, bandwidth of the communications link connecting device 300 to server 400, latency of the connection between device 300 and server 400, a calculation of the preferred number of requests and/or any other suitable criteria or criterion. In that regard, the disclosure is not limited to using Equation 1 to determine the preferred number of outstanding requests.

At time $t_{14}$, device 300 can determine that the preferred number of outstanding requests is greater than the number of requests that are currently outstanding and transmits Request 6 to server 400. In some embodiments, multiple requests may be sent at time $t_{14}$ in order to raise the total number of outstanding requests to the preferred number. In some embodiments, by increasing the number of outstanding requests, device 300 may fully utilize network 214. The request is received at the server at time $t_{15}$.

At time $t_{16}$, device 300 can determine whether to cancel any of the requests that are currently outstanding (e.g., Requests 2-6). By way of example, device 300 may cancel outstanding requests in response to the occurrence of one or more of the following events:

E1: The bandwidth of a communications link connecting device 300 to server 400 increases.
E2: The bandwidth of a communications link connecting device 300 to server 400 decreases.
E3: The latency of the connection between device 300 and server 400 decreases.
E4: The latency of the connection between device 300 and server 400 increases.
E5: Signal strength associated with the connection between device 300 and server 400 increases.
E6: Signal strength associated with the connection between device 300 and server 400 decreases.
E7: An underflow condition occurs (e.g., see FIG. 6B).
E8: The amount of data stored in a buffer of device 300 exceeds a threshold (e.g., see FIG. 6C).
E9: User input is received at device 300 forcing it to request higher/lower encoding bit rate for the content.
E10: Device 300 becomes unable to handle current encoding bit rate of the content (e.g., due to the device's processor slowing down).

Specifically, in some embodiments, device 300 may cancel outstanding requests when the bandwidth of the connection between device 300 and server 400 either increases or decreases. Cancelling outstanding requests when the amount of available bandwidth has increased may permit device 300 to issue new requests for blocks of the content that have a higher encoding bit rate. Similarly, cancelling outstanding requests when the amount of available bandwidth has decreased may permit device 300 to issue new requests for blocks of the content that have a lower encoding bit rate. In that regard, device 300 may cancel outstanding requests in order to increase the quality of the content's playback (when additional bandwidth becomes available) or maintain the playback uninterrupted when the amount of available bandwidth decreases Device 300, in some embodiments, may adapt to changing network conditions by keeping the number of outstanding requests as low as possible while still ensuring an appropriate utilization level for network 214, or network path connecting device 300 to server 400.

At time $t_{17}$, device 300 determines how many requests to cancel. The determination may be made in accordance with a policy rule. Examples of policy rules may include:

R1: Determine a preferred number of outstanding requests (e.g., by using Equation 1) and reduce the number of request that are currently outstanding down to the preferred number.
R2: For each X Mbits/sec increase in the bandwidth of the communications path(s) connecting device 300 to server 400, cancel one outstanding request.
R3: For each X Mbits/sec decrease in the bandwidth of the communications path(s) connecting device 300 to server 400, cancel one outstanding request.
R4: For each X sec increase in the amount of playable content stored in the buffer of device 300, cancel one outstanding request.
R5: For each X Mbits increase in the amount of content stored in the buffer of device 300, cancel one outstanding request.
R6: For each X Mbits of content stored in the buffer of device 300, cancel one outstanding request.
R7: Reduce the amount of data that is requested by all outstanding requests to a predetermined quantity (e.g., 20 MB or 20 sec of playable content).
R8: Cancel at least one outstanding request in response to detecting an underflow condition (e.g., see FIG. 6B).
R9: Cancel all outstanding requests in response to detecting an underflow condition (e.g., see FIG. 6B).
R10: Any combination of rules R1 through R9.

In some embodiments, the policy rule for cancelling one or more outstanding requests may be driven by at least two considerations that at are odds with one another. For example, it might be desirable for device 300 to switch to using a different encoding bit rate for the streamed content as soon as possible. Yet, it might also be desirable for device 300 to avoid a depletion of its buffer and disruptions in playback of the content over the course of switching to a different bit rate. To balance these considerations, as illustrated above, the policy rule for determining how many outstanding requests to cancel may be based on one or more of size of blocks that are being requested, number of requests that are currently outstanding, bit rate at which the content in the blocks is encoded, bandwidth of the communications link connecting device 300 to server 400, latency of the connection between device 300 and server 400, a calculation of the preferred number of requests, and/or any other suitable criteria or criterion.

At time $t_{18}$, device 300 may cancel one or more outstanding requests. The cancellation may be performed based on the number determined at time $t_{17}$. For example, if at time $t_{17}$ device 300 determines that two (2) requests need to be canceled, the device may cancel the two outstanding requests that were transmitted most recently (e.g., Requests 5-6).

In some embodiments, outstanding requests may be canceled by device 300 transmitting a cancellation notice that identifies one or more outstanding requests. Upon receiving such a notice, server 400 may cancel processing of the identified requests. As another example, in some embodiments, the cancellation may involve terminating the current communications session between device 300 and server 400, starting a new communications session, and re-issuing requests that were outstanding when the first session was canceled except for those requests that needed to be canceled. Terminating the current communications session may be utilized as a means for request cancellation in circumstances where the OSI application layer protocol used for the content streaming does not permit selective request cancellation. HTTP 1.1 is an example of one such protocol. It should be noted that in some embodiments, due to the time it may take to cancel requests and build up a new connection, request cancellation may need to be avoided as much as possible.

In this example, responses to the requests that remain outstanding after the cancellation is performed, namely Requests 2-4, are transmitted at times $t_{20a-c}$, $t_{22a-c}$, and $t_{24a-c}$, respectively. Those responses are received at client device 300 at times $t_{21a-c}$, $t_{23a-c}$, and $t_{25a-c}$, respectively.

Figure 6A:
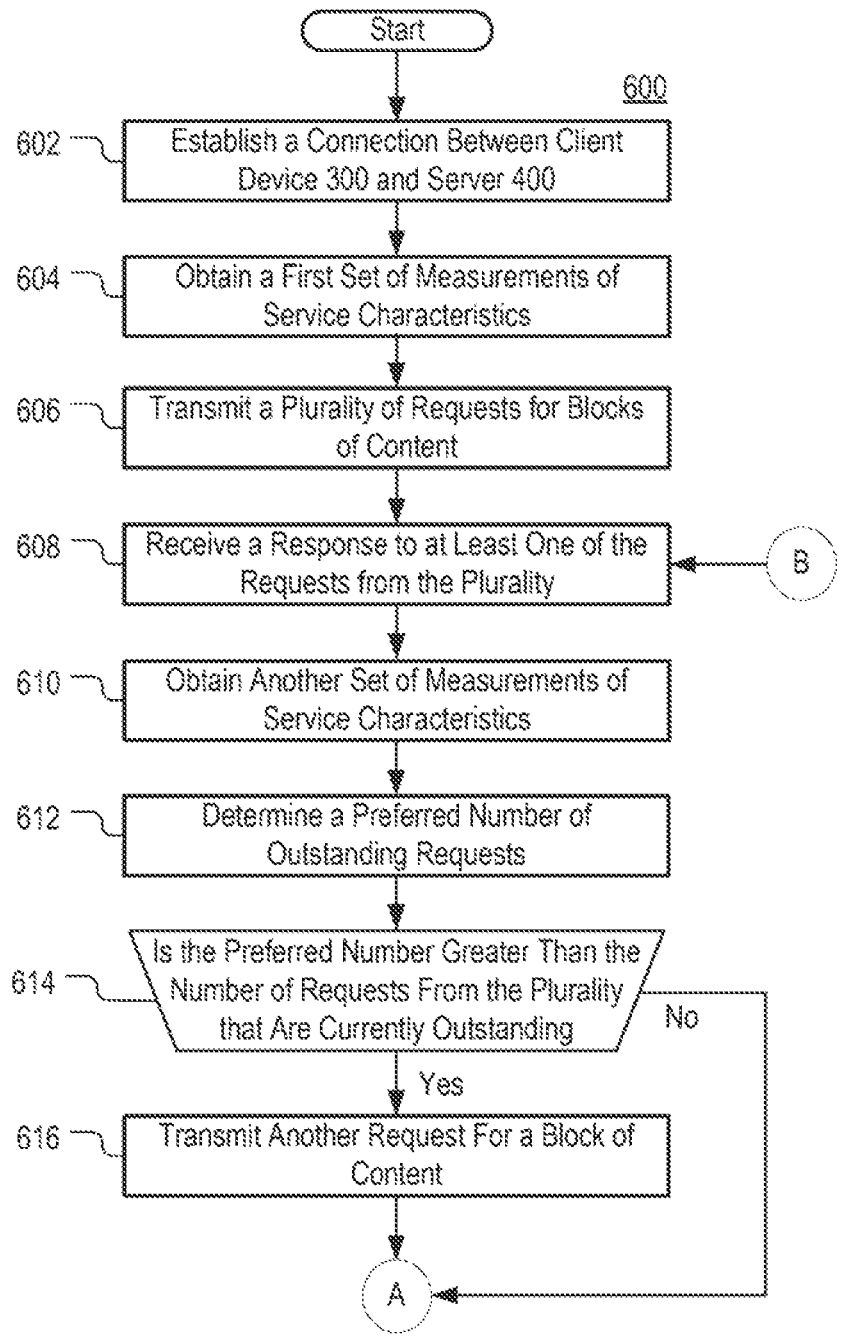
FIGS. 6A, 6B, and 6C show an example of a flow diagram of a first portion of a process for streaming of content, in accordance with some embodiments of the invention.
Figure 6B:
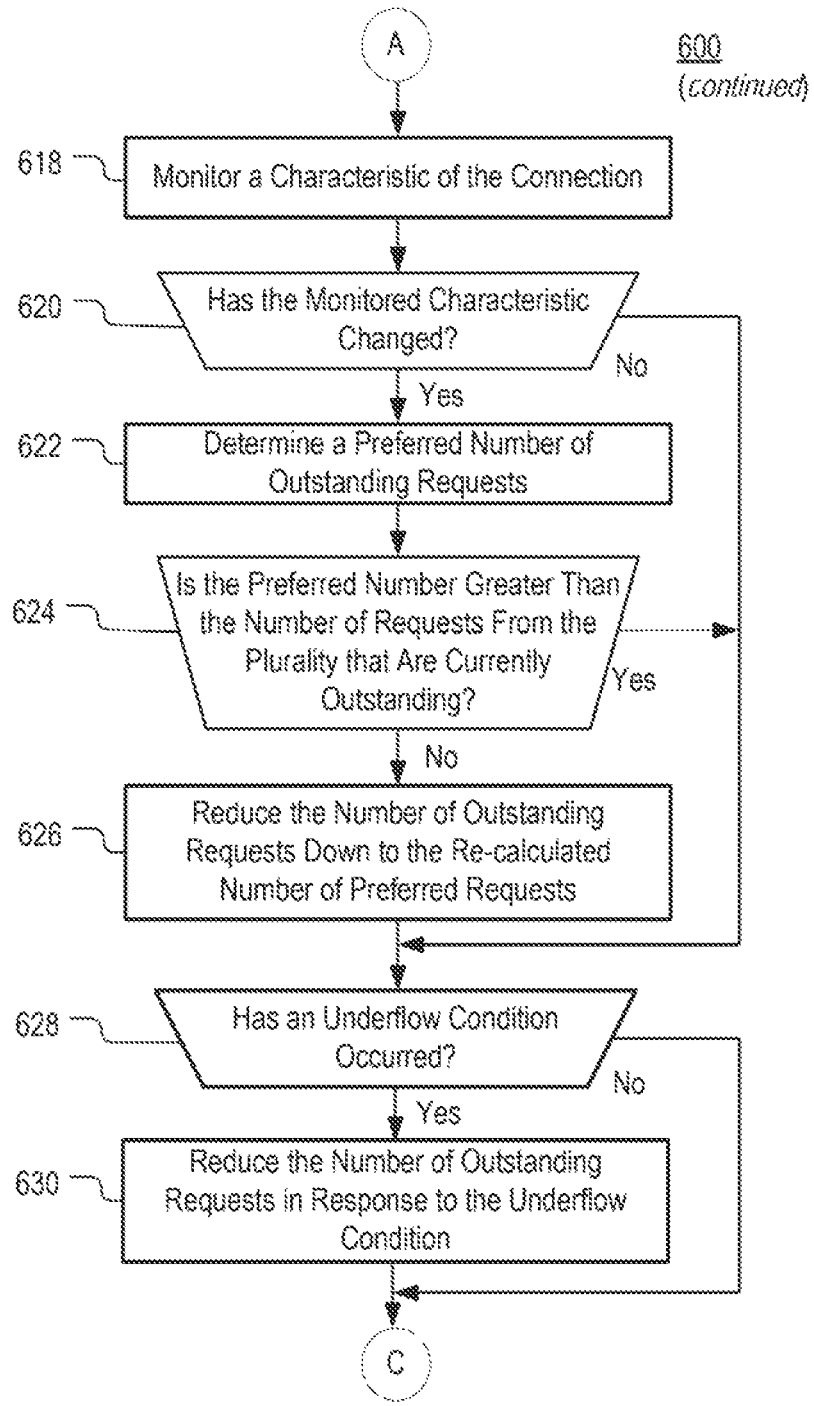
Figure 6C:
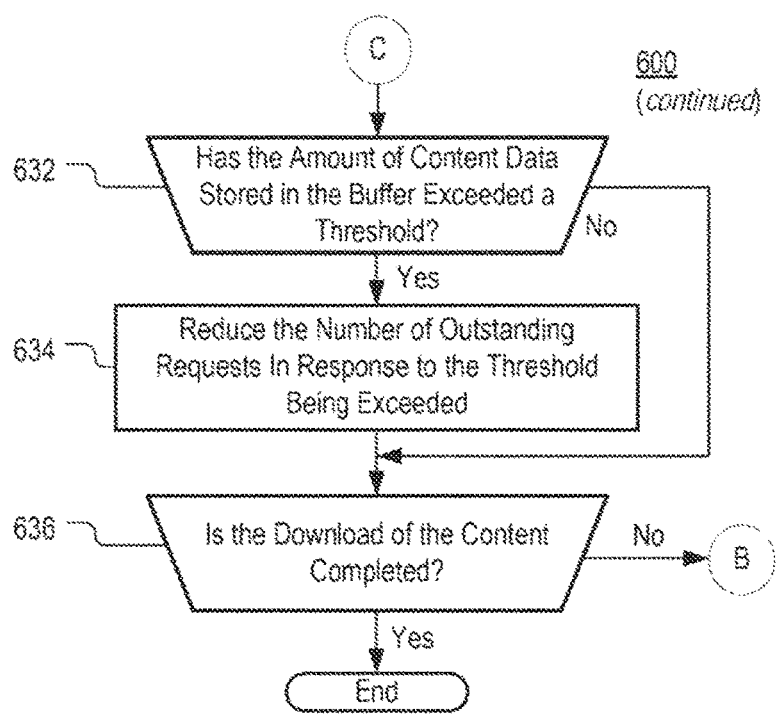

FIGS. 6A-C illustrate an example of a process 600 for transferring content between a server and a client device in accordance with some embodiments of the disclosure. At 602, a connection between device 300 and server 400 is established. At 604, a set of measurements of service characteristics of the connection between device 300 and server 400 is obtained. The set of measurements, in some embodiments, may include a single measurement of one service characteristic. In other embodiments, however, the set may include a plurality of measurements, each measurement of the plurality being one of a different characteristic. In this example, the set includes measurements of the bandwidth and latency of the connection between device 300 and server 400. In other examples however, the service characteristic(s) may be any characteristic(s) that is indicative of the bandwidth and/or latency of the connection between device 300 and server 400. For example, in some embodiments, the service characteristic(s) may include, signal strength of network connection of device 300, type of network access used by device 300 (e.g., a broadband network, a 3G network, of a 4G network), or any other suitable characteristic. Device 300 may alone take measurements of the monitored characteristic(s) or, additionally or alternatively, device 300 may obtain the measurements from another node (e.g., server 400 or a network switch on the path between server 400 or device 300).

At 606, device 300 transmits a plurality of requests. Each request in the plurality specifies a different block of the content that device 300 seeks to obtain. In some embodiments, the number of requests in the plurality may depend on the set of measurements obtained at 604. Moreover, in some embodiments, the number of requests in the plurality may be determined using Equation 1 and/or one or more rules for determining a preferred number of outstanding requests.

At 608, a response to a request from the plurality is received at device 300. At 610, device 300 obtains another set of measurements of the same service characteristics whose measurements are obtained at 604. At 612, device 300 calculates a preferred number of outstanding requests. For example, in some embodiments, the preferred number may be calculated using Equation 1. As another example, in some embodiments, the preferred number may be calculated using one or more rules for calculating preferred numbers. As yet another example, in some embodiments, the preferred number may be calculated based on how many blocks of the content remain to be requested before the download of the content is finished.

At 614, a determination is made whether the preferred number of requests is determined to be greater than the number of service requests that are currently outstanding. If the preferred number is greater, at 616, one or more requests for other blocks of the content are transmitted from device 300 to server 400. Otherwise, process 600 proceeds to step 618. In some embodiments, the preferred number of outstanding requests may be re-calculated dynamically every time a response to an outstanding request is received.

At 618, device 300 monitors a service characteristic of the connection. The service characteristic may be one or more of latency, bandwidth or another characteristic that is indicative of the bandwidth and/or latency of the connection between device 300 and server 400, such as throughput, signal strength of network connection of the device 300, type of network access used by device (e.g., broadband, 3G, 4G), the time to cancel a request, or another similar characteristic. Device 300 may alone take measurements of the monitored characteristic or, additionally or alternatively, it may obtain the measurements from another node (e.g., server 400 or a network switch on the path between server 400 or device 300).

At 620, device 300 determines whether the value of the service characteristic has changed. In some aspects, device 300 may determine whether the most recent measurement of the monitored characteristic is greater or less (e.g., by a predetermined threshold or absolutely) than a previous measurement of the same characteristic. For example, in some embodiments, device 300 may determine whether the bandwidth of the connection between device 300 and server 400 has increased. Upon a positive determination, the process proceeds to 622. Otherwise, the process proceeds to 628.

At 622, device 300 calculates a preferred number of outstanding requests. The preferred number may be determined in accordance with Equation 1 or one or more rules for determining preferred numbers. In some embodiments, the preferred number may be calculated based on how many blocks of the content of have not been requested yet, and need to be requested before the download of the content is finished. At 624, device 300 determines whether the preferred number of requests is smaller than the number of requests that are currently outstanding. If the preferred number of requests is greater than or equal to the number of requests that are currently outstanding, the process proceeds to 628. Otherwise, in instances where the preferred number is less than the number of requests that are currently outstanding, the process proceeds to 626.

At 626, device 330 reduces the number of requests down to the preferred number. In doing so, device 300 may cancel as many requests as is necessary in order to bring the total number of outstanding requests down to the preferred number.

At 628, device 300 determines whether an underflow condition has occurred. In some embodiments, an underflow condition may exist when portions of the content that are stored in a media buffer of device 300 are consumed at a faster rate by the device than the rate at which new portions of the content arrive at device 300. In some aspects, underflow conditions may be caused by a decrease of the bandwidth, or increase of the latency, of the connection between server 400 and device 300. In other aspects, underflow conditions may be caused by events that take place at device 300 that cause the media content stored in the buffer to be depleted faster than expected (e.g., the receipt of a fast-forwarding instruction from a user).

Underflow conditions, in some embodiments, may be detected based on one or more of, amount of content data stored in the buffer, bit rate at which the content in the buffer is encoded, bandwidth of the connection, latency of the connection, and/or any other suitable quality of service metric of the connection. In some embodiments, an underflow condition may be considered to exist when the following inequality is met:

$$\frac{\text{size data}}{\text{current rate}} \geq t_{video\ in\ buffer} - t_{delay} - t_{cancel\ request} - t_{safety\ margin} \quad \text{(Eq. 3)}$$

where "current rate" is the bandwidth of the connection between server 400 and device 300, "size data" is the sum of the sizes of all blocks that have been requested by the requests that are currently outstanding, $t_{video\ in\ buffer}$ is the total play time of all blocks of the content that are stored in the buffer, $t_{delay}$ is a minimum playtime of content data that needs to be stored in the buffer of device 300 in order to prevent an underflow, $t_{cancel\ request}$ is an estimate of the time it takes the device 300 to cancel a request, and $t_{safety\ margin}$ may be an additional safety margin that can be specified by an administrator. In some embodiments, $t_{delay}$ may be set to equal between two (2) seconds and eight (8) seconds, or any other suitable variable. Furthermore, in some embodiments, $t_{cancel\ request}$ may be determined experimentally.

If an underflow condition is determined to have occurred, process 600 proceeds to 630. Otherwise, process 600 proceeds to 632. At 630, device 300 reduces the number requests from the plurality that are still outstanding down to the preferred number. In doing so, device 300 may cancel one or more of the outstanding requests. In some embodiments, the number of requests that are canceled may be determined in accordance with any one of the policy rules discussed with respect to FIG. 5B. Furthermore, in some embodiments, device 300 may maximize user experience by preventing underflow as much as possible by keeping the number of outstanding requests as low as possible and cancelling outstanding requests only when absolutely necessary. In general, underflow may be prevented by canceling at least some outstanding requests when an underflow condition is detected and switching to a lower encoding bit-rate. In some embodiments, the switching may entail transmitting new requests for blocks of content and specifying a lower bit-rate at which the content is to be encoded. The lower encoding bit-rate may be specified inside the new requests or in a separate message.

Furthermore, in some embodiments, whether an underflow condition exists may be determined with respect to an individual request for a block of content. In some of these embodiments, the value of $t_{video\ in\ buffer}$ may be based, at least partially, on the size, or playback duration, of one or more blocks of content that have been requested before the individual request is transmitted, but are yet to be downloaded at device 300. As can be readily appreciated, each downloaded block of content will increase the amount of content in the buffer, if it arrives before the buffer is depleted. Moreover, in some of these embodiments, the value of $t_{video\ in\ buffer}$ may be based on an estimate of the time it would take to download, at device 300, a block of content that is requested by one of the preceding requests in order to account for the fact that the content in the buffer is depleted while the block is being downloaded. Notably, whether an underflow condition exists may be determined with respect to each individual outstanding request in order to determine whether to cancel this request. This iterative approach may be more accurate and it may prevent unnecessary cancellations.

At 632, device 300 determines whether the amount of data stored in the buffer exceeds a predetermined threshold. If the amount of data is less than or equal to the threshold, the process proceeds to 636. Otherwise, the process proceeds to 634. At 634, in response to detecting that the threshold is exceeded, device 300 reduces the number of outstanding requests down to the preferred number. In doing so, device 300 may cancel one or more of the outstanding requests. In some embodiments, the number of requests that are canceled may be determined in accordance with any one of the policy rules discussed with respect to FIG. 5B.

At 636, device 300 determines whether the download of the content is completed. The download of the content is completed when the last block of the content has been received. If the download is completed, process 600 ends. Otherwise, the process returns to 608.

Although in the above example the tasks of process 600 are performed by device 300, or processing circuitry of device 300, in other examples one or more of the steps may be performed by server 400, or processing circuitry of 404 of server 400. It is to be understood that in such embodiments steps that are not performed by server 400 may still be performed by client device 300.

For instance, server 400, in some embodiments, may obtain the first set of measurements of service characteristics. By way of example, server 400, in some embodiments, may determine, at 604, the number of requests in the plurality, and communicate that number to device 300. Server 400, in some embodiments, may determine, at 608, the other set of measurements of service characteristics. Server 400, in some embodiments, may similarly determine the preferred number of outstanding requests. By way of example, server 400 may communicate, at 612, the determined number to device 300. Server 400, in some embodiments, may determine whether the preferred number is greater than the number of requests that are currently outstanding. Server 400, in some embodiments, may monitor, at 618, a characteristic of the connection. Server 400, in some embodiments, may determine, at 620, whether the monitored characteristic has changed. Server 400, in some embodiments, may calculate, at 622, the preferred number of outstanding requests. Server 400, in some embodiments, may determine, at 624, whether the preferred number is greater than the requests that are currently outstanding. Server 400, in some embodiments, may reduce, at 626, the number of outstanding requests if the preferred number is less than the number of requests that are currently outstanding (e.g., by removing requests from the waiting queue of the server). Server 400, in some embodiments, may determine, at 628, whether an underflow condition has occurred. Server 400, in some embodiments, may reduce, at 630, the number of outstanding requests in response to detecting the underflow condition.

Furthermore, in some embodiments, one or more of the tasks in process 600 that are not performed by server 400 or device 300 may be performed by another device that is part of network 214. In that regards, it is to be understood that the technique disclosed with respect to FIGS. 6A-C may be performed by any combination of network nodes.

Furthermore, it should be understood that the above steps of the flow diagrams of FIGS. 6A-B may be executed or performed in any order or sequence not limited to the order and sequence shown and described in the figures. Furthermore, it should be understood, some of the above steps of the flow diagrams of FIGS. 6A-C may be executed or performed substantially simultaneously where appropriate or in parallel to reduce latency and processing times. And still furthermore, it should be understood, some of the above steps of the flow diagrams of FIGS. 6A-C may be omitted. Although the above embodiments of the invention are described in reference to content streaming, it is to be understood that the techniques disclosed herein may be used in any type of data downloading, including downloading of content that is not rendered (or played) while the download is taking place.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above described embodiments of the present disclosure are presented for purposes of illustration and not of limitation, and the present disclosure is limited only by the claims which follow.

What is claimed is:

1. A system for controlling delivery of content, the system comprising:
   processing circuitry configured to:
   transmit, to a server, a plurality of requests for blocks of the content;
   while at least some of the plurality of requests are still outstanding:
     detect a change of a service characteristic of a connection between the system and the server, where the service characteristic is based on a measurement of latency between the system and the server and a measurement of bandwidth of the connection with the server;
     determine a preferred number of outstanding requests based upon the service characteristic, wherein the outstanding requests are for blocks of varying sizes; and
     cancel at least some of the requests from the plurality that are still outstanding based on the preferred number and a count of the requests from the plurality that are still outstanding.

2. The system for controlling delivery of content of claim 1, wherein determining the preferred number of requests is evaluated using the following expression:

$$\text{preferred number of requests} = \left\lceil \frac{t_{latency}}{t_{transmission}} \right\rceil + 1$$

where $t_{latency}$ is a latency and $t_{transmission}$ is a transmission time.

3. The system for controlling delivery of content of claim 2, wherein the transmission time can be evaluated using the following expression:

$$t_{transmission} = \frac{\text{block size}}{\text{bandwidth}}$$

where block size is a size of the requests for blocks of content and bandwidth is a bandwidth.

4. The system for controlling delivery of content of claim 1, wherein the plurality of requests for blocks of content are transmitted using an Open Systems Interconnect (OSI) application-layer protocol.

5. The system for controlling delivery of content of claim 1, wherein each block of content in the plurality of requested blocks of content is a fragment of a larger content file.

6. The system for controlling delivery of content of claim 1, wherein the content is streaming content from a live performance.

7. The system for controlling delivery of content of claim 6, wherein the streaming content is from a live performance.

8. A method for controlling delivery of content, comprising:
   transmitting by a device to a server via a connection, a plurality of requests for blocks of content;
   while at least some of the plurality of requests are still outstanding;
     detecting a change of a service characteristic of a connection between the device and the server, where the service characteristic is based on a measurement of latency between the device and the server and a measurement of bandwidth of the connection with the server;
     determining a preferred number of outstanding requests based upon the service characteristic, wherein the outstanding requests are for blocks of varying sizes; and
     canceling at least some of the requests from the plurality of that are still outstanding based on the preferred number and a count of the requests from the plurality that are still outstanding.

9. The method for controlling delivery of content of claim 8, wherein determining the preferred number of requests is evaluated using the following expression:

$$\text{preferred number of requests} = \left\lceil \frac{t_{latency}}{t_{transmission}} \right\rceil + 1$$

where $t_{latency}$ is a latency and $t_{transmission}$ is a transmission time.

10. The method for controlling delivery of content of claim 9, wherein the transmission time can be evaluated using the following expression:

$$t_{transmission} = \frac{\text{block size}}{\text{bandwidth}}$$

where block size is a size of the requests for blocks of content and bandwidth is a bandwidth.

11. The method for controlling delivery of content of claim 8, wherein the plurality of requests for blocks of content are transmitted using an Open Systems Interconnect (OSI) application-layer protocol.

12. The method for controlling delivery of content of claim 8, wherein each block of content in the plurality of requested blocks of content is a fragment of a larger content file.

13. The method for controlling delivery of content of claim 8, wherein the content is streaming content from a live performance.

14. The method for controlling delivery of content of claim 13, wherein the streaming content is from a live performance.

\* \* \* \* \*